US011257356B2

(12) United States Patent
Tannenbaum et al.

(10) Patent No.: US 11,257,356 B2
(45) Date of Patent: *Feb. 22, 2022

(54) SYSTEMS AND METHODS FOR PRESENTING SECURITY QUESTIONS VIA CONNECTED SECURITY SYSTEM

(71) Applicant: GOOGLE LLC, Mountain View, CA (US)

(72) Inventors: Harry Tannenbaum, San Francisco, CA (US); Scott Hong, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,354

(22) Filed: Aug. 28, 2020

(65) Prior Publication Data
US 2020/0394901 A1    Dec. 17, 2020

Related U.S. Application Data

(63) Continuation of application No. 16/532,251, filed on Aug. 5, 2019, now Pat. No. 10,762,772, which is a
(Continued)

(51) Int. Cl.
*G08B 29/18* (2006.01)
*G08B 13/22* (2006.01)
(Continued)

(52) U.S. Cl.
CPC ............ *G08B 29/185* (2013.01); *G06F 21/42* (2013.01); *G07C 9/00* (2013.01); *G07C 9/27* (2020.01);
(Continued)

(58) Field of Classification Search
CPC ...... G08B 29/185; G08B 13/22; G08B 25/14; G08B 13/00; G08B 13/19682;
(Continued)

(56) References Cited

U.S. PATENT DOCUMENTS

2004/0229569 A1 * 11/2004 Franz .................... H04M 3/16
455/66.1
2007/0216764 A1 * 9/2007 Kwak ............... G07C 9/00309
348/14.06
(Continued)

*Primary Examiner* — Mohamed Barakat
(74) *Attorney, Agent, or Firm* — Butzel Long

(57) ABSTRACT

The various implementations described herein include methods, devices and systems for detecting trigger events and executing security protocols. In one aspect, a method is performed at a server system that is coupled to a smart device system and a client device, the smart device system located at a premises. The server system: (1) detects an unverified user within the premises based on data collected by the smart device system, wherein the data is communicated to the server system via the wide area networks; (2) provides a notification regarding the unverified user to authorized users via the wide area networks; (3) receives, from a first authorized user, a first user input in response to the notification; and (4) in response to receiving the first user input, executes a security operation at the premises based on the first user input.

20 Claims, 19 Drawing Sheets

Related U.S. Application Data continuation of application No. 15/877,239, filed on Jan. 22, 2018, now Pat. No. 10,373,481, which is a continuation of application No. 14/697,505, filed on Apr. 27, 2015, now Pat. No. 9,875,647.

(51) Int. Cl.
| | | |
|---|---|---|
| *G06F 21/42* | (2013.01) | |
| *G08B 25/14* | (2006.01) | |
| *G07C 9/00* | (2020.01) | |
| *G07C 9/27* | (2020.01) | |
| *G07C 9/28* | (2020.01) | |
| *H04L 12/24* | (2006.01) | |
| *G06F 21/34* | (2013.01) | |
| *G08B 13/00* | (2006.01) | |
| *G08B 13/196* | (2006.01) | |
| *G08B 15/00* | (2006.01) | |
| *G08B 21/04* | (2006.01) | |
| *G08B 25/00* | (2006.01) | |
| *G08B 27/00* | (2006.01) | |
| *H04L 41/22* | (2022.01) | |

(52) U.S. Cl.
CPC ............... *G07C 9/28* (2020.01); *G08B 13/22* (2013.01); *G08B 25/14* (2013.01); *G06F 21/34* (2013.01); *G08B 13/00* (2013.01); *G08B 13/19682* (2013.01); *G08B 15/007* (2013.01); *G08B 21/0423* (2013.01); *G08B 25/008* (2013.01); *G08B 25/009* (2013.01); *G08B 27/003* (2013.01); *H04L 41/22* (2013.01)

(58) Field of Classification Search
CPC ............. G08B 15/007; G08B 21/0423; G08B 25/008; G08B 25/009; G08B 27/003; H04L 41/22; G06F 21/34; G06F 21/42; G07C 9/27; G07C 9/28; G07C 9/00
See application file for complete search history.

(56) References Cited

U.S. PATENT DOCUMENTS

| 2015/0228167 A1* | 8/2015 | Scalisi | G08B 13/19695 340/326 |
| 2015/0325067 A1* | 11/2015 | Lee | G07C 9/29 340/5.65 |
| 2015/0363989 A1* | 12/2015 | Scalisi | H04N 7/186 348/143 |

* cited by examiner

SYSTEMS AND METHODS FOR PRESENTING SECURITY QUESTIONS VIA CONNECTED SECURITY SYSTEM

RELATED APPLICATIONS

This application is a continuation of and claims priority to U.S. application Ser. No. 16/532,251, filed Aug. 5, 2019, entitled "Systems and Methods for Presenting Security Questions via Connected Security System," which a continuation of and claims priority to U.S. application Ser. No. 15/877,239, filed Jan. 22, 2018, entitled "Systems and Methods for Presenting Security Questions via Connected Security System," now U.S. Pat. No. 10,373,481, issued on Aug. 6, 2019, which is a continuation of U.S. application Ser. No. 14/697,505, filed Apr. 27, 2015, now U.S. Pat. No. 9,875,647, issued on Jan. 23, 2018, entitled "Systems and Methods for Presenting Security Questions via Connected Security System," each of which is hereby incorporated by reference in its entirety.

TECHNICAL FIELD

This relates generally to security systems, including but not limited to methods and systems for detecting trigger events and executing security protocols.

BACKGROUND

Security systems have traditionally lacked granularity with respect to identifying and classifying a detected threat. An armed system that detects movement on a premises, for example, will trigger an alarm regardless of whether the cause truly warrants an alarm. Consequently, isolating false alarm scenarios from legitimate threats within an environment has long been a challenge with typical security systems.

SUMMARY

Accordingly, there is a need for methods, systems, and interfaces for detecting trigger events and executing security protocols. By utilizing information and data gathered by one or more devices or systems in a connected network, precise and accurate context is provided with respect to events that trigger an alarm in an environment. Furthermore, by executing predefined security protocols in response, such as presenting unverified users with security questions that they must correctly answer, false alarm scenarios can be better distinguished from legitimate threats and proper actions can be taken in response.

In accordance with some implementations, a method is performed at a computer system (e.g., one or more smart devices in a smart home network) with one or more processors and memory storing instructions for execution by the one or more processors. The method includes detecting a trigger event, including detecting an unverified user within the premises. A notification is provided regarding the detected trigger event to one or more authorized users distinct from the unverified user. The method further includes receiving, from a first authorized user of the one or more authorized users, a first user input responsive to the notification and corresponding to instructions to execute a first security protocol. In response to receiving the first user input, the first security protocol is executed. Executing the first security protocol includes presenting to the unverified user an authentication request and monitoring the premises for a response to the authentication request. Furthermore, executing the first security protocol includes executing or declining to execute a second security protocol based on the response to the authentication request.

In accordance with some implementations, a computer system (e.g., one or more smart devices in a smart home network) includes one or more processors, memory, and one or more programs; the one or more programs are stored in the memory and configured to be executed by the one or more processors. The one or more programs include instructions for performing the operations of the method described above. In accordance with some implementations, a non-transitory computer-readable storage medium has stored therein instructions that, when executed by the computer system, cause the computer system to perform the operations of the method described above.

Thus, computer systems are provided with more effective and efficient methods for detecting trigger events and executing security protocols, thereby increasing the effectiveness and efficiency of such devices and systems.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
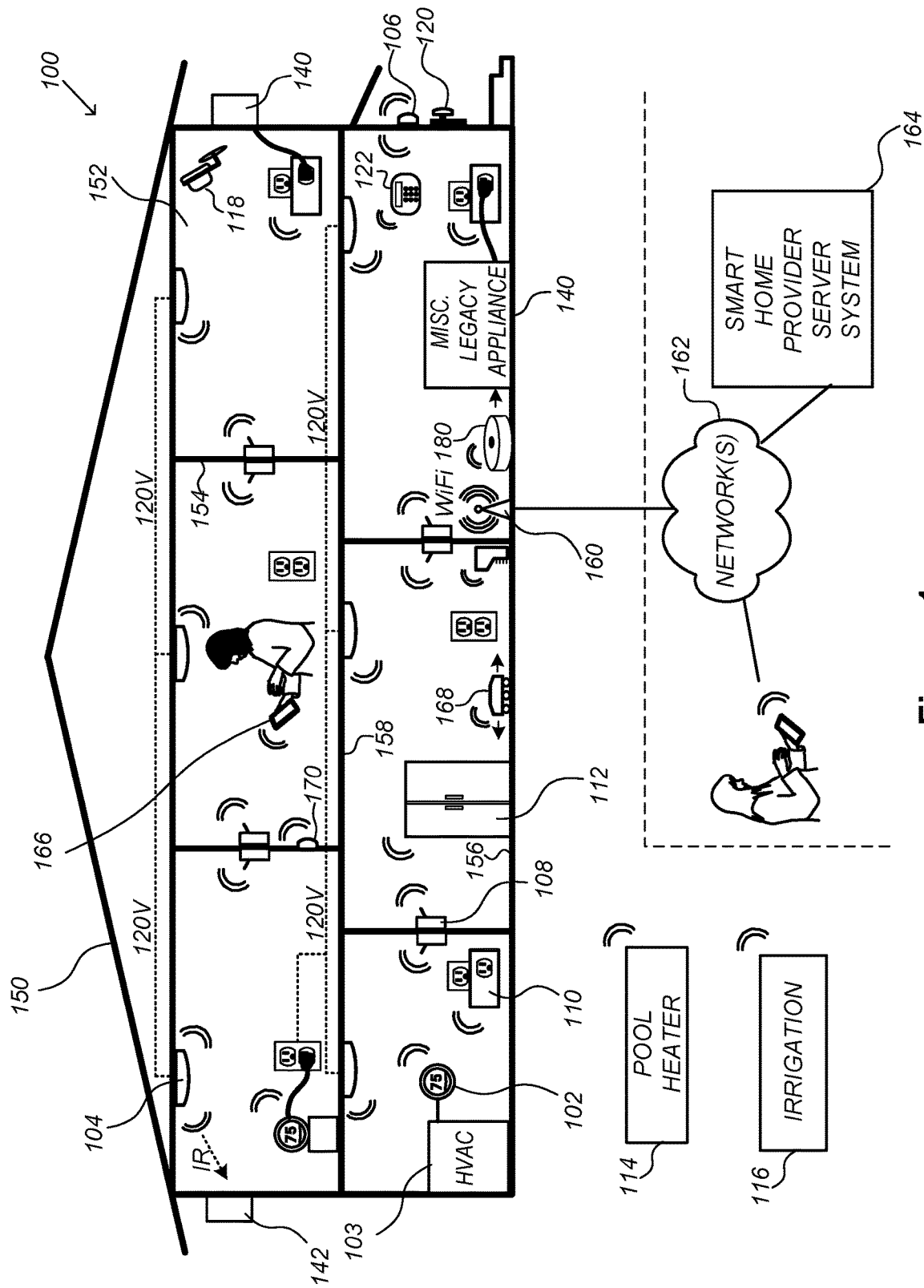
FIG. 1 is an example smart home environment, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first type of security protocol could be termed a second type of security protocol, and, similarly, a second type of security protocol could be termed a first type of security protocol, without departing from the scope of the various described implementations. The first type of security protocol and the second type of security protocol are both types of security protocols, but they are not the same type of security protocol.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is an example smart home environment 100 in accordance with some implementations. The Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart doorlocks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding black-body radiation data as output.

The smart doorbell 106 and/or the smart doorlock 120 may detect a person's approach to or departure from a location (e.g., an outer door), control doorbell/door locking functionality (e.g., receive user inputs from a portable electronic device 166-1 to actuate bolt of the smart doorlock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart doorlocks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2:
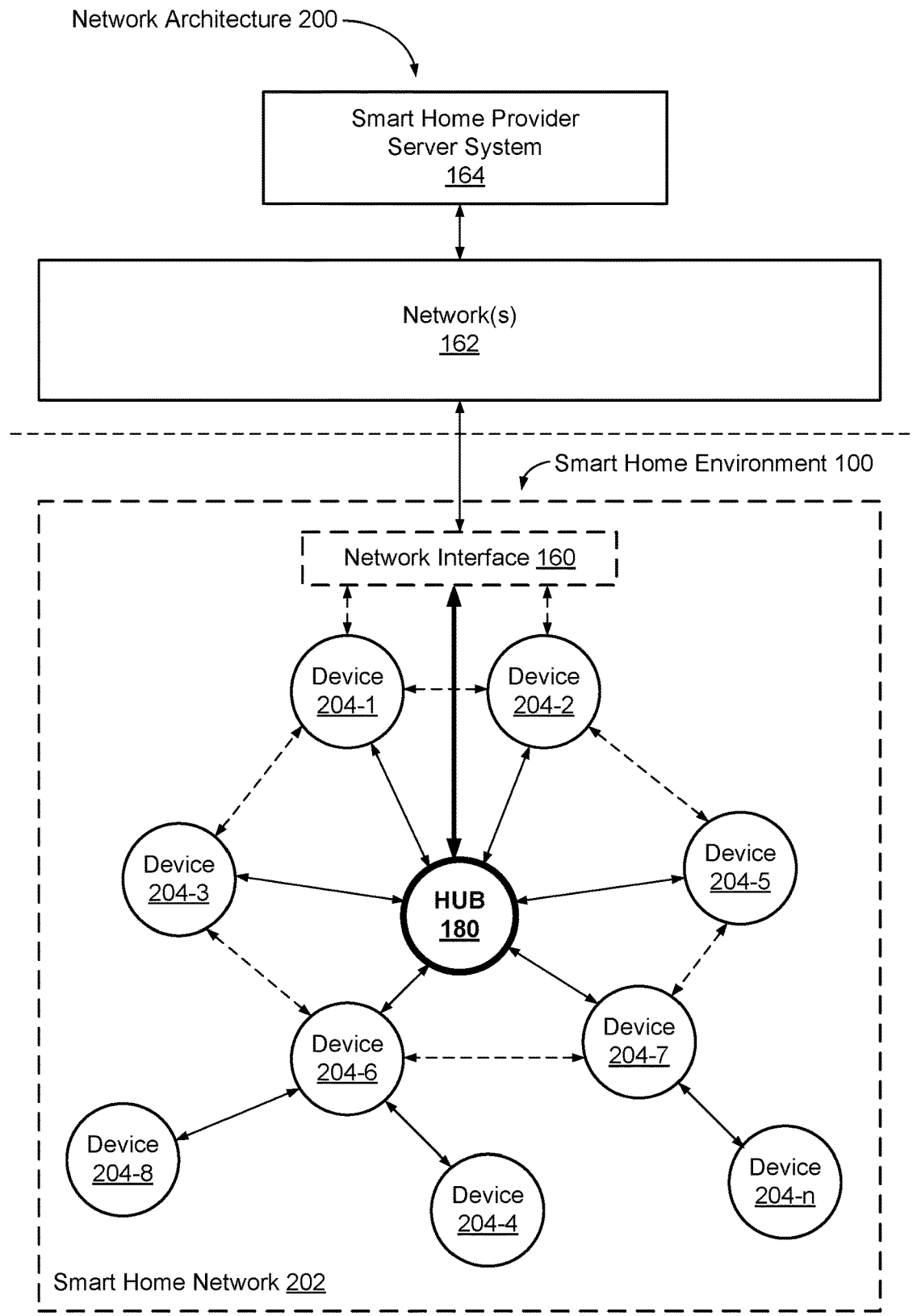
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
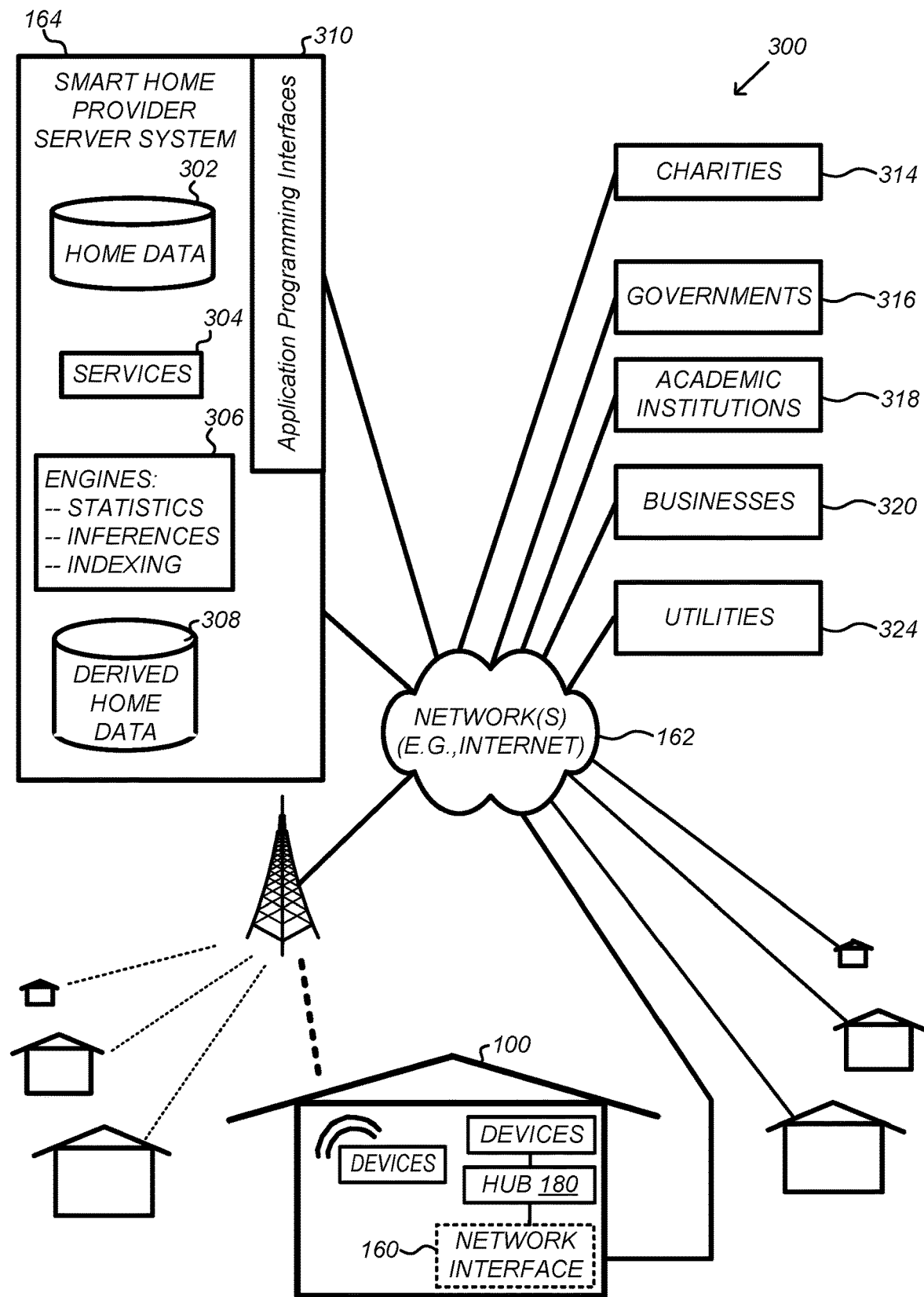
FIG. 3 illustrates a network-level view of an extensible devices and services platform with which the smart home environment of FIG. 1 is integrated, in accordance with some implementations.
Figure 4:
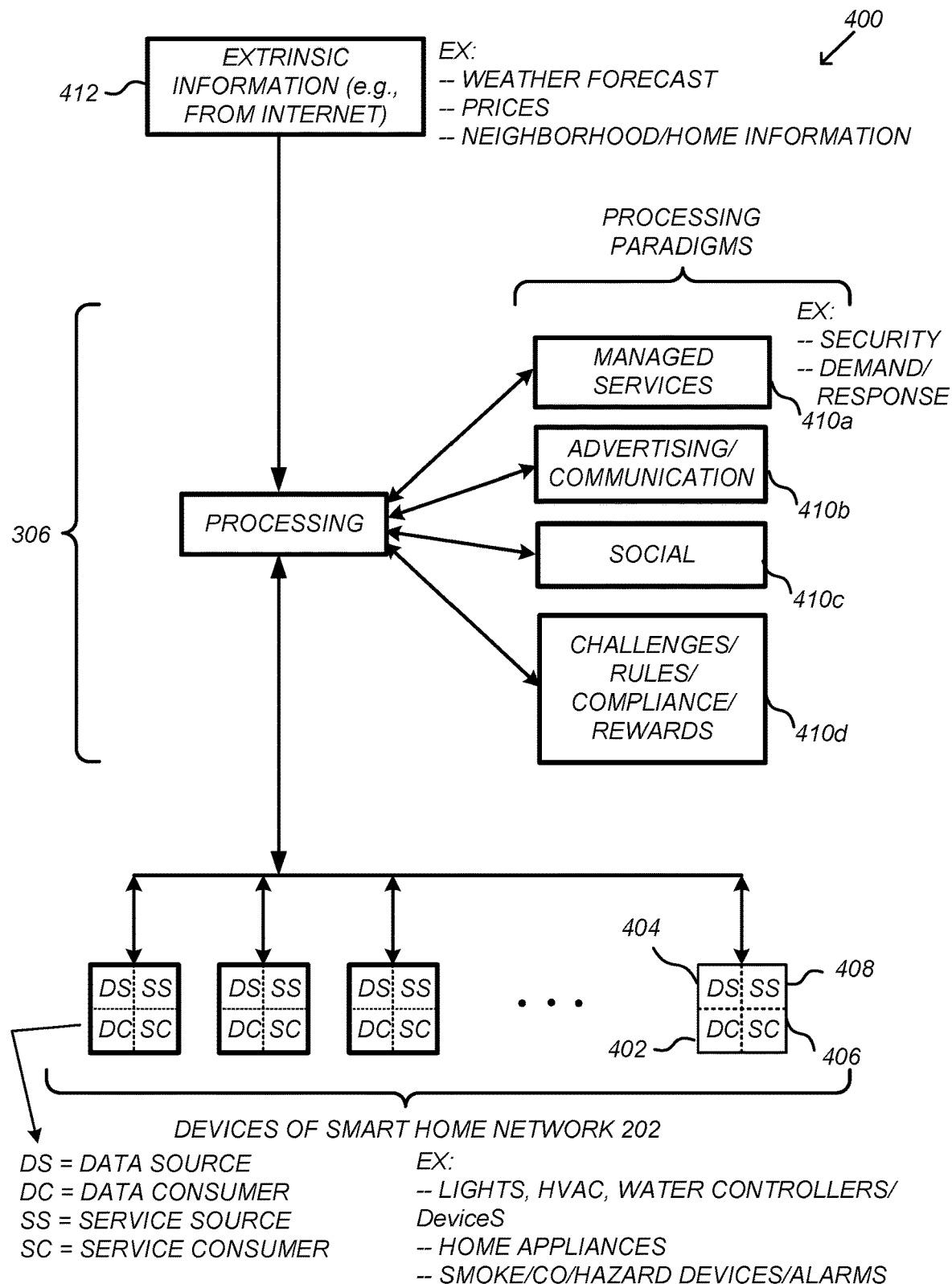
FIG. 4 illustrates an abstracted functional view of the extensible devices and services platform of FIG. 3, with reference to a processing engine as well as devices of the smart home environment, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108,

110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
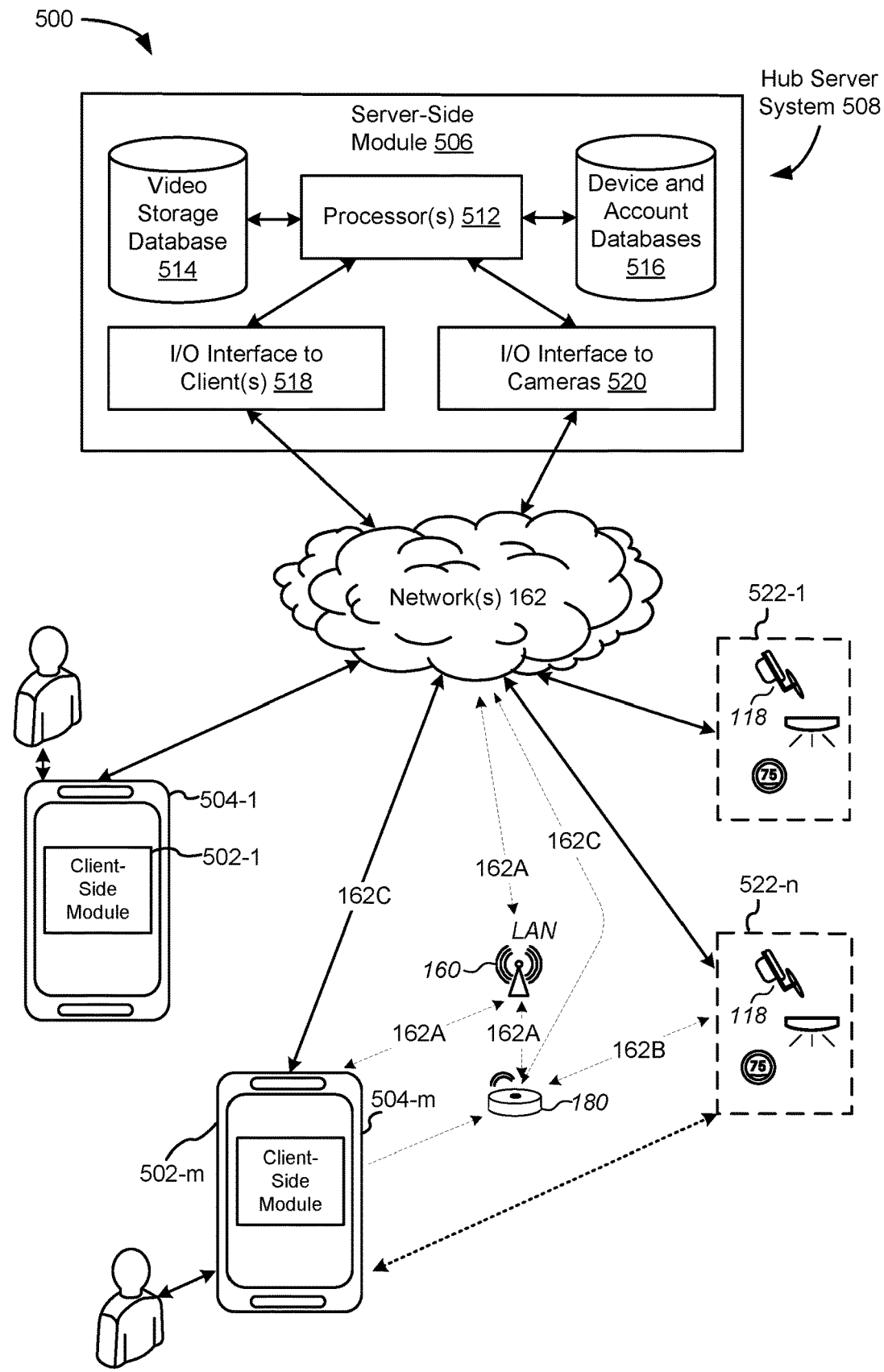
FIG. 5 is a representative operating environment in which a hub device server system interacts with client devices and hub devices communicatively coupled to local smart devices, in accordance with some implementations.

FIG. 5 illustrates a representative operating environment 500 in which a hub device server system 508 provides data processing for monitoring and facilitating review of motion events in video streams captured by video cameras 118. As shown in FIG. 5, the hub device server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the hub device server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the hub device server system 508. In some implementations, the hub device server system 508 is a dedicated video processing server that provides video processing services to video sources and client devices 504 independent of other services provided by the hub device server system 508.

In some implementations, each of the video sources 522 includes one or more video cameras 118 that capture video and send the captured video to the hub device server system 508 substantially in real-time. In some implementations, each of the video sources 522 optionally includes a controller device (not shown) that serves as an intermediary between the one or more cameras 118 and the hub device server system 508. The controller device receives the video data from the one or more cameras 118, optionally, performs some preliminary processing on the video data, and sends the video data to the hub device server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the hub device server system 508.

As shown in FIG. 5, in accordance with some implementations, each of the client devices 504 includes a client-side module 502. The client-side module 502 communicates with a server-side module 506 executed on the hub device server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the hub device server system 508 is implemented on one or more standalone data processing apparatuses or a distributed network of computers. In some implementations, the hub device server system 508 also employs various virtual devices and/or services of third party service providers (e.g., third-party cloud service providers) to provide the underlying computing resources and/or infrastructure resources of the hub device server system 508. In some implementations, the hub device server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub device server system 508 can vary in different implementations. For example, in some implementations, client-side module 502 is a thin-client that provides only user-facing input and output processing functions, and delegates all other data processing functionalities to a backend server (e.g., the hub device server system 508). Similarly, in some implementations, a respective one of the video sources 522 is a simple video capturing device that continuously captures and streams video data to the hub device server system 508 without no or limited local preliminary processing on the video data. Although many aspects of the present technology are described from the perspective of the hub device server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub device server system 508, the client device 504, and the video sources 522 cooperatively.

It should be understood that operating environment 500 that involves the hub device server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504-m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

Figure 6:
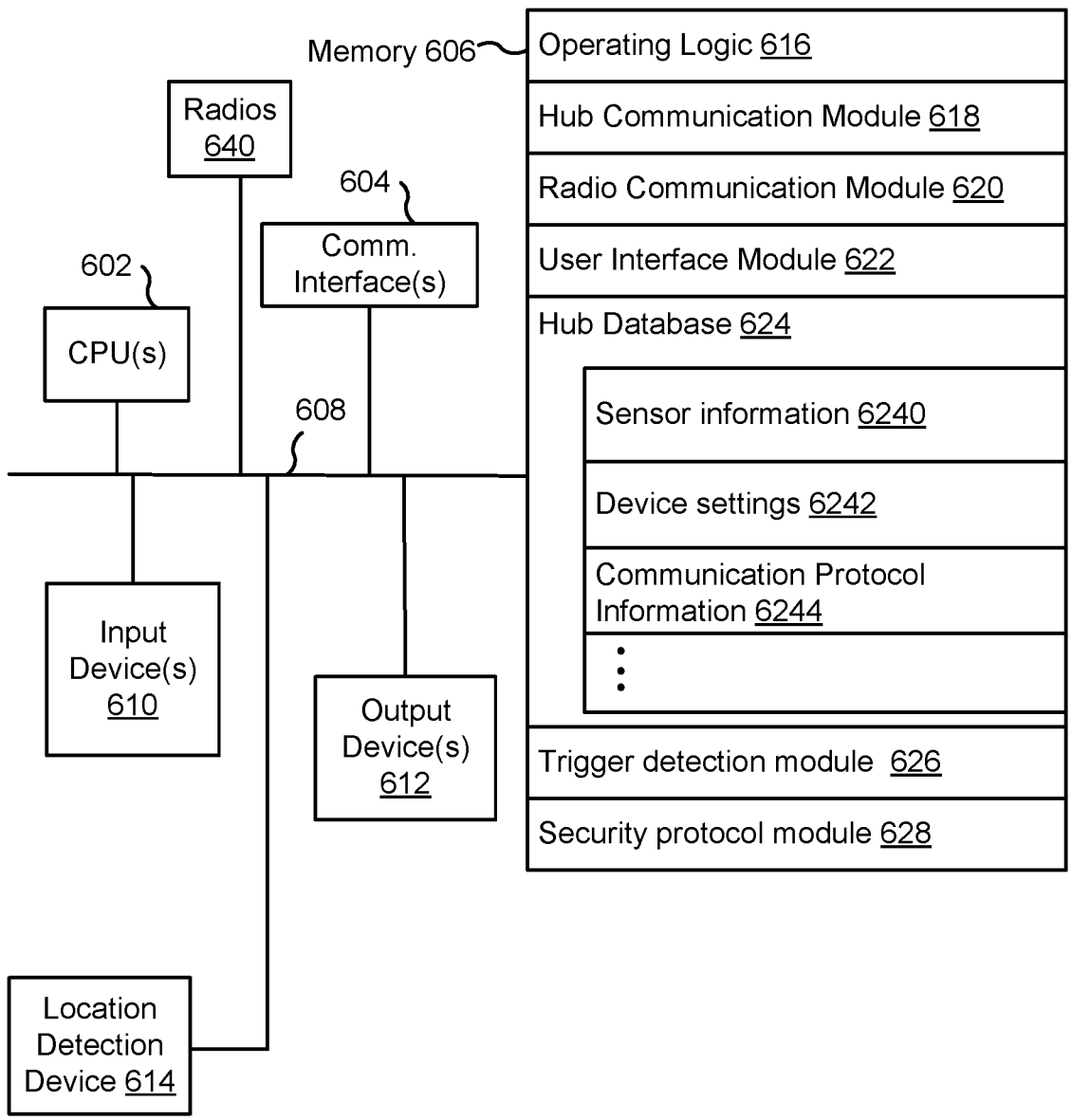
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 640 enables one or more radio communication networks in the smart home environments, and allows a hub device to communicate with smart devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating logic 616 including procedures for handling various basic system services and for performing hardware dependent tasks;
- Hub device communication module 618 for connecting to and communicating with other network devices, systems, and entities (e.g., network interface 160, such as a router that provides Internet connectivity, networked storage devices, network routing devices, server system 508, security call center 1102, emergency responders 1104, smart home provider server system 164, client devices 504, smart home environments 100, etc.) connected to one or more networks 162 via one or more communication interfaces 604 (wired or wireless);
- Radio Communication Module 620 for connecting the hub device 180 to other devices (e.g., controller devices, smart devices 204 in smart home environment 100, client devices 504) via one or more radio communication devices (e.g., radios 640);
- User interface module 622 for providing and displaying a user interface in which settings, captured data, and/or other data for one or more devices (e.g., smart devices 204 in smart home environment 100) can be configured and/or viewed, for displaying notifications of trigger events (e.g., the GUI and notification 1300 of FIG. 13A), and/or for detecting user inputs (e.g., user input indicating selection of a UI element, FIG. 13C);
- Hub device database 624, including but not limited to:
    - Sensor information 6240 for storing and managing data received, detected, and/or transmitted by one or more sensors of the hub device 180 and/or one or more other devices (e.g., smart devices 204 in smart home environment 100);
    - Device settings 6242 for storing operational settings for one or more devices (e.g., coupled smart devices 204 in smart home environment 100); and
    - Communication protocol information 6244 for storing and managing protocol information for one or more protocols (e.g., standard wireless protocols, such as ZigBee, Z-Wave, etc., and/or custom or standard wired protocols, such as Ethernet); and
- Trigger Detection Module 626 for detecting trigger events (e.g., using optional built-in sensors and inputs of the hub device 180, smart devices 204, and/or any other devices in the smart security network 1100), providing notifications of detected trigger events, managing and identifying user activity patterns (e.g., recording user behavior and identifying behavioral patterns); and
- Security Protocol Module 628 for executing or declining to execute security protocols and other operations (e.g., coordinating operations of one or more systems and devices of a smart security network 1100 in accordance with user inputs corresponding to instructions to execute a security protocol, the user inputs received through hub device communication module 618 and/or radio communication module 620).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
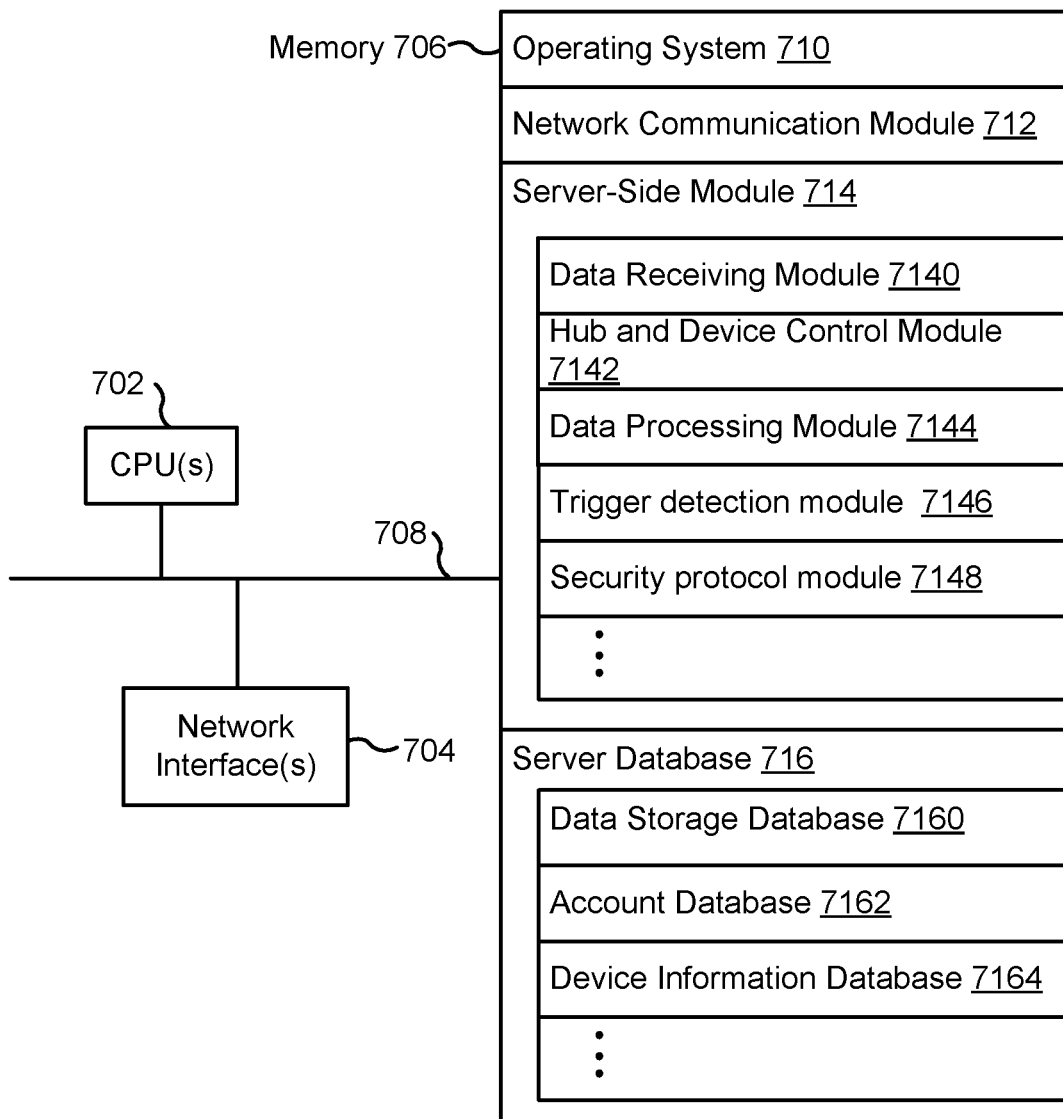
FIG. 7 is a block diagram illustrating a representative hub server system, in accordance with some implementations.

FIG. 7 is a block diagram illustrating the hub server system 508 in accordance with some implementations. The hub server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 710 including procedures for handling various basic system services and for performing hardware dependent tasks;

Network communication module 712 for connecting the hub server system 508 to other systems, devices, and entities (e.g., client devices, electronic devices, and systems connected to one or more networks 162, such as security call center 1102, emergency responders 1104, smart home provider server system 164, client devices 504, smart home environments 100, etc.) via one or more network interfaces 704 (wired or wireless);

Server-side module 714, which provides server-side functionalities for device control, data processing and data review, including but not limited to:

Data receiving module 7140 for receiving data from electronic devices (e.g., video data from a camera 118, FIG. 1) via the hub device 180, and preparing the received data for further processing and storage in the data storage database 7160;

Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 7144 for processing the data provided by the electronic devices, and/or preparing and sending processed data to a device for review (e.g., client devices 504 for review by a user);

Trigger Detection Module 7146 for detecting trigger events (e.g., based on data from optional built-in sensors and inputs of the hub device 180, smart devices 204, and/or any other devices in the smart security network 1100, received from network communication module 712 and/or data receiving module 7140), providing notifications of detected trigger events, managing and identifying user activity patterns (e.g., recording user behavior and identifying behavioral patterns); and Security Protocol Module 7148 for executing or declining to execute security protocols and other operations (e.g., coordinating operations of one or more systems and devices of a smart security network 1100 in accordance with user inputs corresponding to instructions to execute a security protocol, the user inputs received from network communication module 712 and/or data receiving module 7140); and Server database 716, including but not limited to:

Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;

Account database 7162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and Device Information Database 7164 for storing device information related to one or more hub devices, e.g., device identifiers and hub device specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 8:
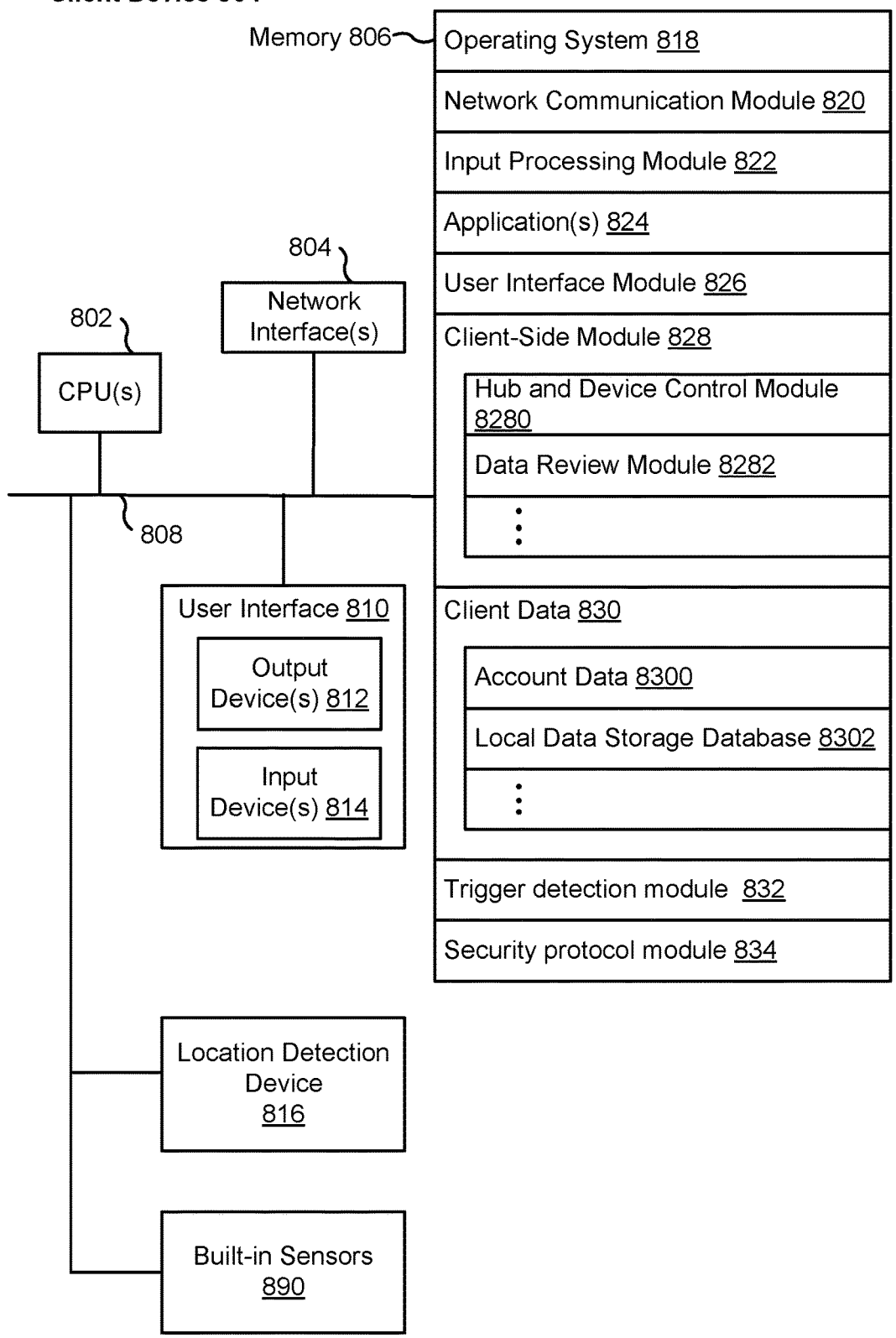
FIG. 8 is a block diagram illustrating a representative client device associated with a user account, in accordance with some implementations.

FIG. 8 is a block diagram illustrating a representative client device 504 associated with a user account in accordance with some implementations. The client device 504, typically, includes one or more processing units (CPUs) 802, one or more network interfaces 804, memory 806, and one or more communication buses 808 for interconnecting these components (sometimes called a chipset). Optionally, the client device also includes a user interface 810 and one or more built-in sensors 890 (e.g., accelerometer and gyroscope). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 816, such as a GPS (global positioning satellite) or other geo-location receiver, for determining the location of the client device.

Figure 13B:
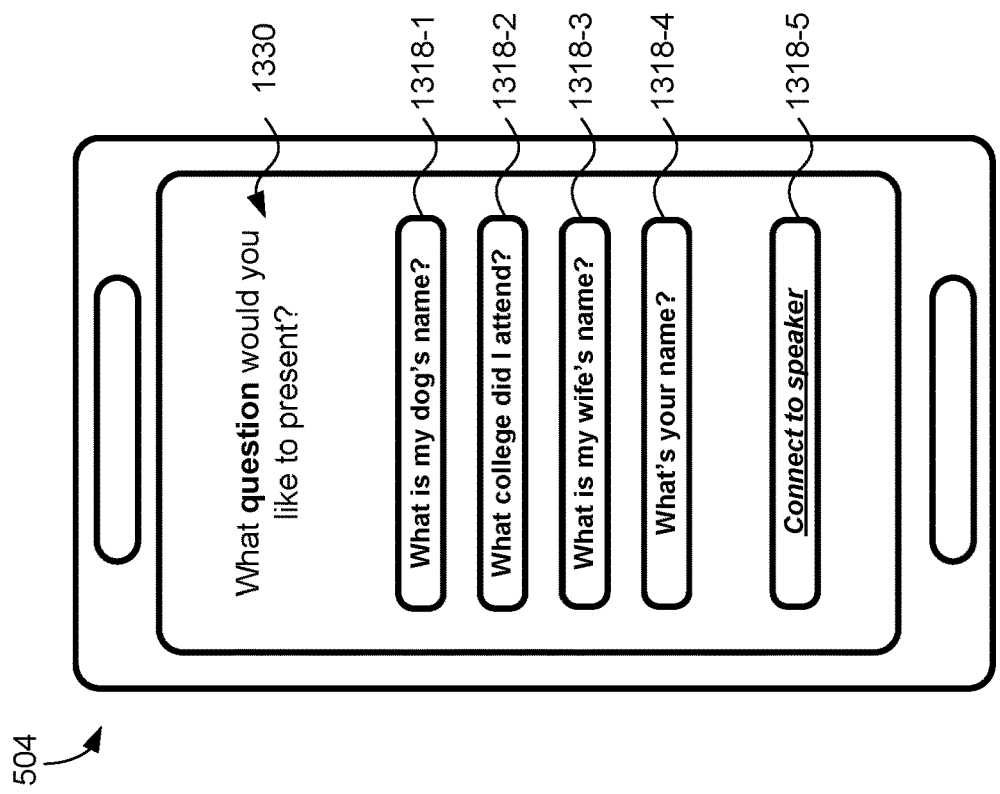
FIGS. 13A-13D illustrate examples of graphical user interfaces for displaying notifications and executing operations responsive to notifications, in accordance with some implementations.
Figure 13A:
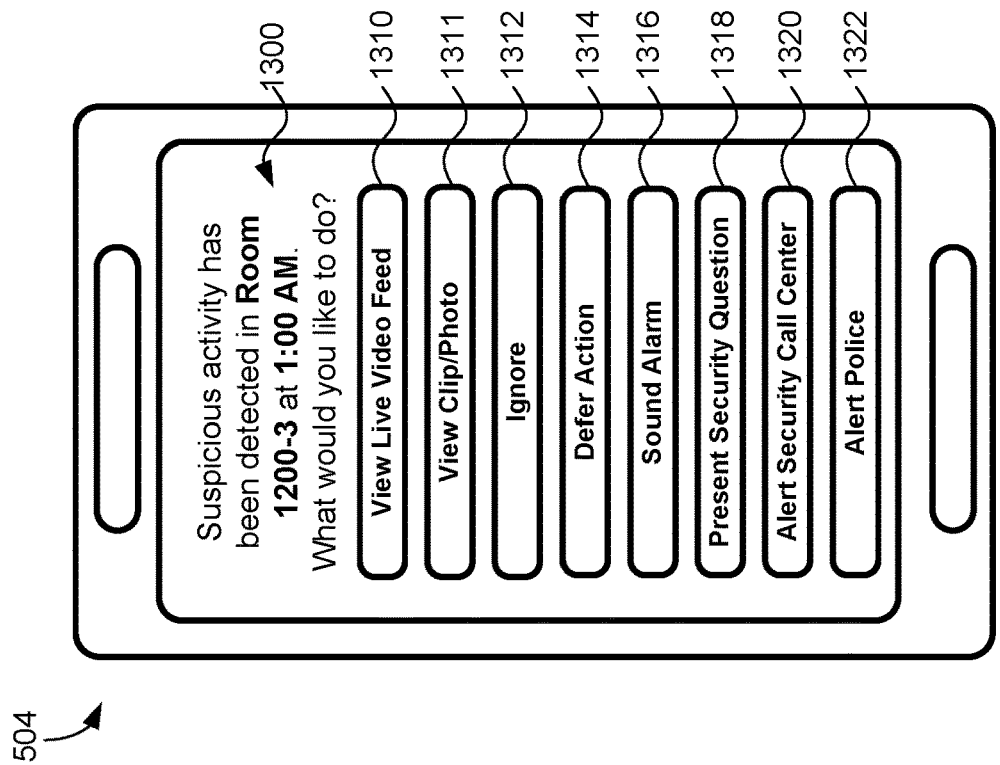
Figure 13D:
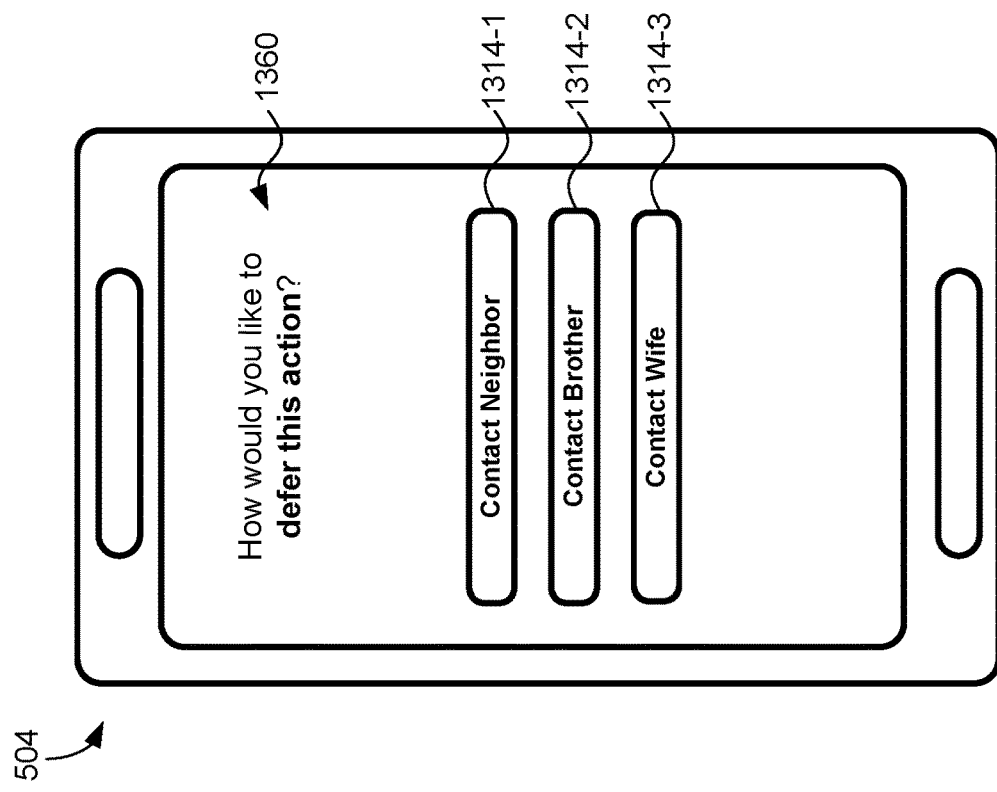
Figure 13C:
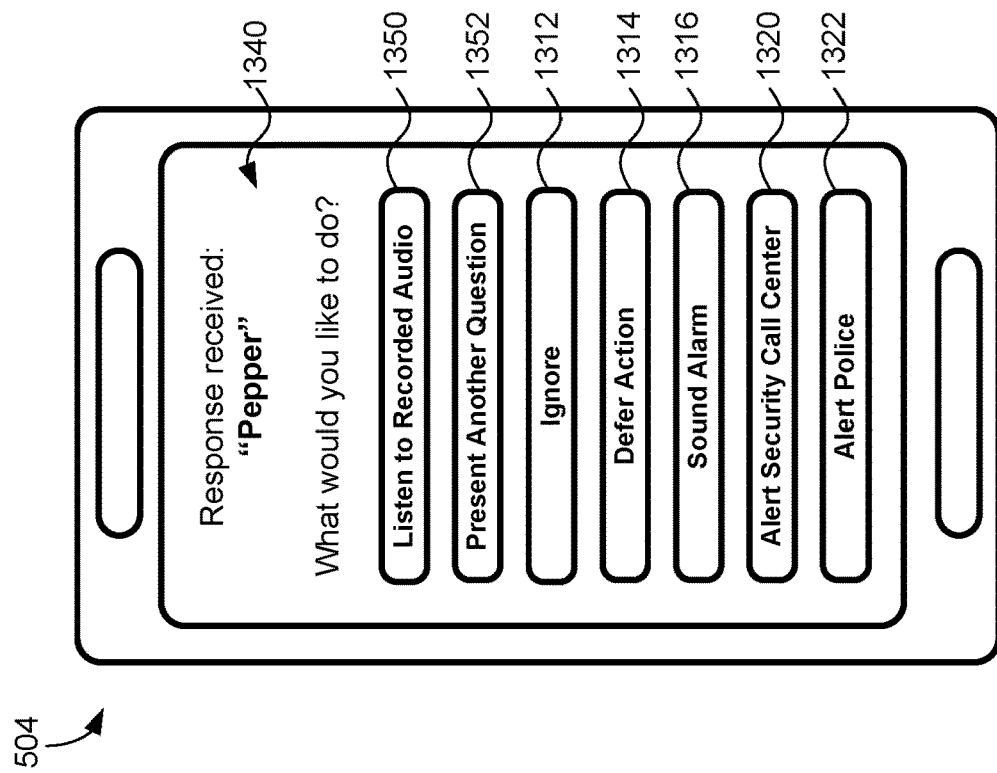

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

Operating system 818 including procedures for handling various basic system services and for performing hardware dependent tasks;

Network communication module 820 for connecting the client device 504 to other devices, systems, and entities (e.g., client devices, electronic devices, and systems connected to one or more networks 162, such as security call center 1102, emergency responders 1104, smart home provider server system 164, client devices 504, smart home environments 100, etc.) via one or more network interfaces 804 (wired or wireless);

Input processing module 822 for detecting one or more user inputs or interactions from one of the one or more input devices 814 and interpreting the detected input or interaction;

One or more applications 824 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);

User interface module 826 for providing and displaying a user interface in which settings, captured data, and/or other data for one or more devices (e.g., smart devices 204 in smart home environment 100) can be configured and/or viewed, for displaying notifications of trigger events (e.g., the GUI and notification 1300 of FIG. 13A), and/or for detecting user inputs (e.g., user input indicating selection of a UI element, FIG. 13C);

Client-side module 828, which provides client-side functionalities for device control, data processing and data review, including but not limited to:
  Hub device and device control module 8280 for generating control commands for modifying an operating mode of the hub device or the electronic devices in accordance with user inputs; and
  Data review module 8282 for providing user interfaces for reviewing data processed by the hub server system 508;

Client data 830 storing data associated with the user account and electronic devices, including, but is not limited to:
  Account data 8300 storing information related to both user accounts loaded on the client device and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
  Local data storage database 8302 for selectively storing raw or processed data associated with electronic devices (e.g., of the video sources 522, such as a camera 118);

Trigger Detection Module 832 for detecting trigger events (e.g., using optional built-in sensors and inputs of the hub device 180, smart devices 204, and/or any other devices in the smart security network 1100), providing notifications of detected trigger events, managing and identifying user activity patterns (e.g., recording user behavior and identifying behavioral patterns); and Security Protocol Module 834 for executing or declining to execute security protocols and other operations (e.g., coordinating operations of one or more systems and devices of a smart security network 1100 in accordance with user inputs corresponding to instructions to execute a security protocol).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

Figure 9:
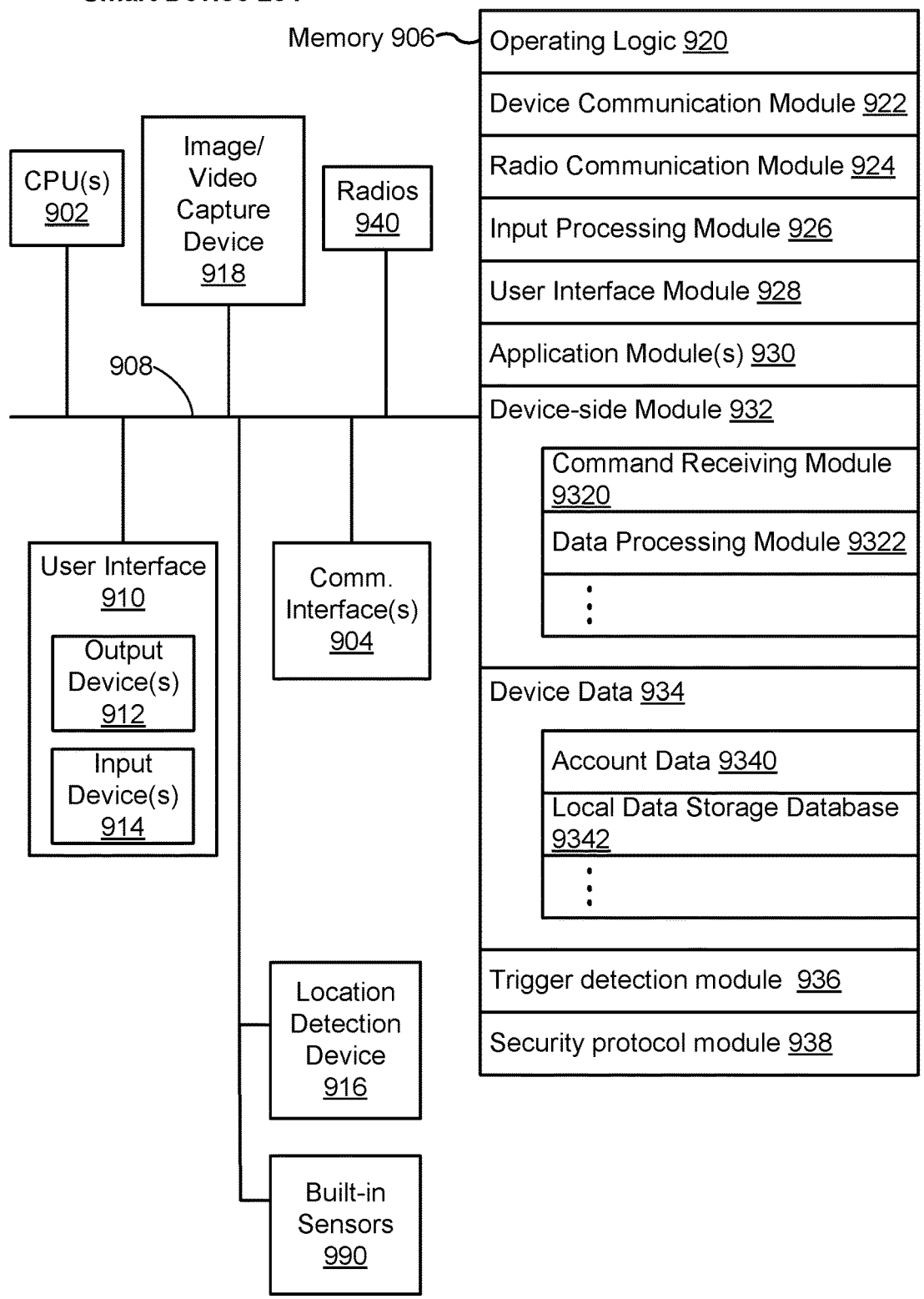
FIG. 9 is a block diagram illustrating a representative smart device, in accordance with some implementations.

FIG. 9 is a block diagram illustrating a representative smart device 204 in accordance with some implementations. In some implementations, the smart device 204 (e.g., any devices of a smart home environment 100, FIGS. 1 and 2) includes one or more processing units (e.g., CPUs, ASICs, FPGAs, microprocessors, and the like) 902, one or more communication interfaces 904, memory 906, radios 940, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 940 enable one or more radio communication networks in the smart home environments, and allow a smart device 204 to communicate with other devices. In some implementations, the radios 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 904 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

Operating logic 920 including procedures for handling various basic system services and for performing hardware dependent tasks;

Device communication module 922 for connecting to and communicating with other network devices, system, and entities (e.g., network interface 160, such as a router that provides Internet connectivity, networked storage devices, network routing devices, server system 508, security call center 1102, emergency responders 1104, smart home provider server system 164, client devices 504, smart home environments 100, etc.) connected to one or more networks 162 via one or more communication interfaces 904 (wired or wireless);

Radio Communication Module 924 for connecting the smart device 204 to other devices (e.g., controller devices, smart devices 204 in smart home environment 100, client devices 504) via one or more radio communication devices (e.g., radios 940)

Input processing module 926 for detecting one or more user inputs or interactions from the one or more input devices 914 and interpreting the detected inputs or interactions;

User interface module 928 for providing and displaying a user interface in which settings, captured data, and/or other data for one or more devices (e.g., the smart device 204, and/or other devices in smart home environment 100) can be configured and/or viewed, for displaying notifications of trigger events (e.g., the GUI and notification 1300 of FIG. 13A), and/or for detecting user inputs (e.g., user input indicating selection of a UI element, FIG. 13C);

One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);

Device-side module 932, which provides device-side functionalities for device control, data processing and data review, including but not limited to:

Command receiving module 9320 for receiving, forwarding, and/or executing instructions and control commands (e.g., from a client device 504, from a smart home provider server system 164, from user inputs detected on the user interface 910, etc.) for operating the smart device 204;

Data processing module 9322 for processing data captured or received by one or more inputs (e.g., input devices 914, image/video capture devices 918, location detection device 916), sensors (e.g., built-in sensors 990), interfaces (e.g., communication interfaces 904, radios 940), and/or other components of the smart device 204, and for preparing and sending processed data to a device for review (e.g., client devices 504 for review by a user); and Device data 934 storing data associated with devices (e.g., the smart device 204), including, but is not limited to:

Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and Local data storage database 9342 for selectively storing raw or processed data associated with the smart device 204 (e.g., video surveillance footage captured by a camera 118);

Trigger Detection Module 936 for detecting trigger events (e.g., using optional built-in sensors and inputs of the hub device 180, smart devices 204, and/or any other devices in the smart security network 1100), providing notifications of detected trigger events, managing and identifying user activity patterns (e.g., recording user behavior and identifying behavioral patterns); and Security Protocol Module 938 for executing or declining to execute security protocols and other operations (e.g., coordinating operations of one or more systems and devices of a smart security network 1100 in accordance with user inputs corresponding to instructions to execute a security protocol, the user inputs received through device communication module 922 and/or radio communication module 924).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

Figure 10:
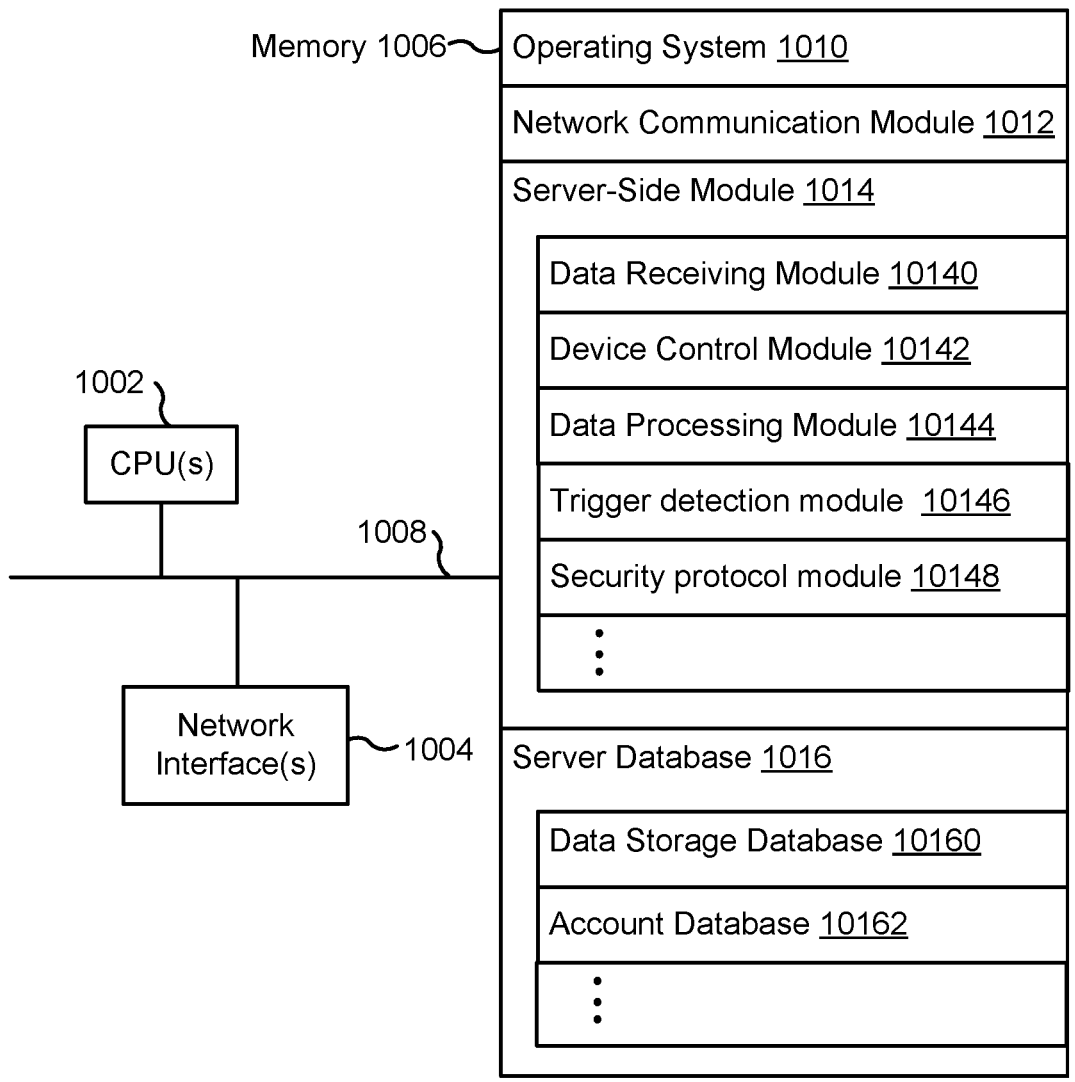
FIG. 10 is a block diagram illustrating a representative smart home provider server system, in accordance with some implementations.

FIG. 10 is a block diagram illustrating the smart home provider server system 164 in accordance with some implementations. The smart home provider server system 164, typically, includes one or more processing units (CPUs) 1002, one or more network interfaces 1004 (e.g., including an I/O interface to one or more client devices and an I/O interface to one or more electronic devices), memory 1006, and one or more communication buses 1008 for interconnecting these components (sometimes called a chipset). Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

Operating system 1010 including procedures for handling various basic system services and for performing hardware dependent tasks;

Network communication module 1012 for connecting the smart home provider server system 164 to other systems, devices, and entities (e.g., client devices, electronic devices, and systems connected to one or more networks 162, such as security call center 1102, emergency responders 1104, smart home provider server system 164, client devices 504, smart home environments 100, etc.) via one or more network interfaces 1004 (wired or wireless);

Server-side module 1014, which provides server-side functionalities for device control, data processing and data review, including but not limited to:

Data receiving module 10140 for receiving data from electronic devices (e.g., video data from a camera 118, FIG. 1), and preparing the received data for further processing and storage in the data storage database 10160;

Device control module 10142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 10144 for processing the data provided by the electronic devices, and/or preparing and sending processed data to a device for review (e.g., client devices 504 for review by a user);

Trigger Detection Module 10146 for detecting trigger events (e.g., based on data from optional built-in sensors and inputs of the hub device 180, smart devices 204, and/or any other devices in the smart security network 1100, received from network communication module 712 and/or data receiving module 7140), providing notifications of detected trigger events, managing and identifying user activity patterns (e.g., recording user behavior and identifying behavioral patterns); and Security Protocol Module 10148 for executing or declining to execute security protocols and other operations (e.g., coordinating operations of one or more systems and devices of a smart security network 1100 in accordance with user inputs corresponding to instructions to execute a security protocol, the user inputs received from network communication module 1012 and/or data receiving module 10140); and Server database 1016, including but not limited to:

Data storage database 10160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely; and Account database 10162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

Furthermore, in some implementations, the functions of any of the devices and systems described herein (e.g., hub device 180, hub server system 508, client device 504, smart device 204, smart home provider server system 164) are interchangeable with one another and may be performed by any other devices or systems, where the corresponding sub-modules of these functions may additionally and/or alternatively be located within and executed by any of the devices and systems. As one example, referring to FIG. 12, the camera 118-2 may detect the trigger event (e.g., presence of an unverified user 1202), while the smart alarm system 122 provides a notification to the client device 504-1 and the hub device 180 executes a first security protocol. The devices and systems shown in and described with respect to FIGS. 6-10 are merely illustrative, and different configurations of the modules for implementing the functions described herein are possible in various implementations.

Figure 11:
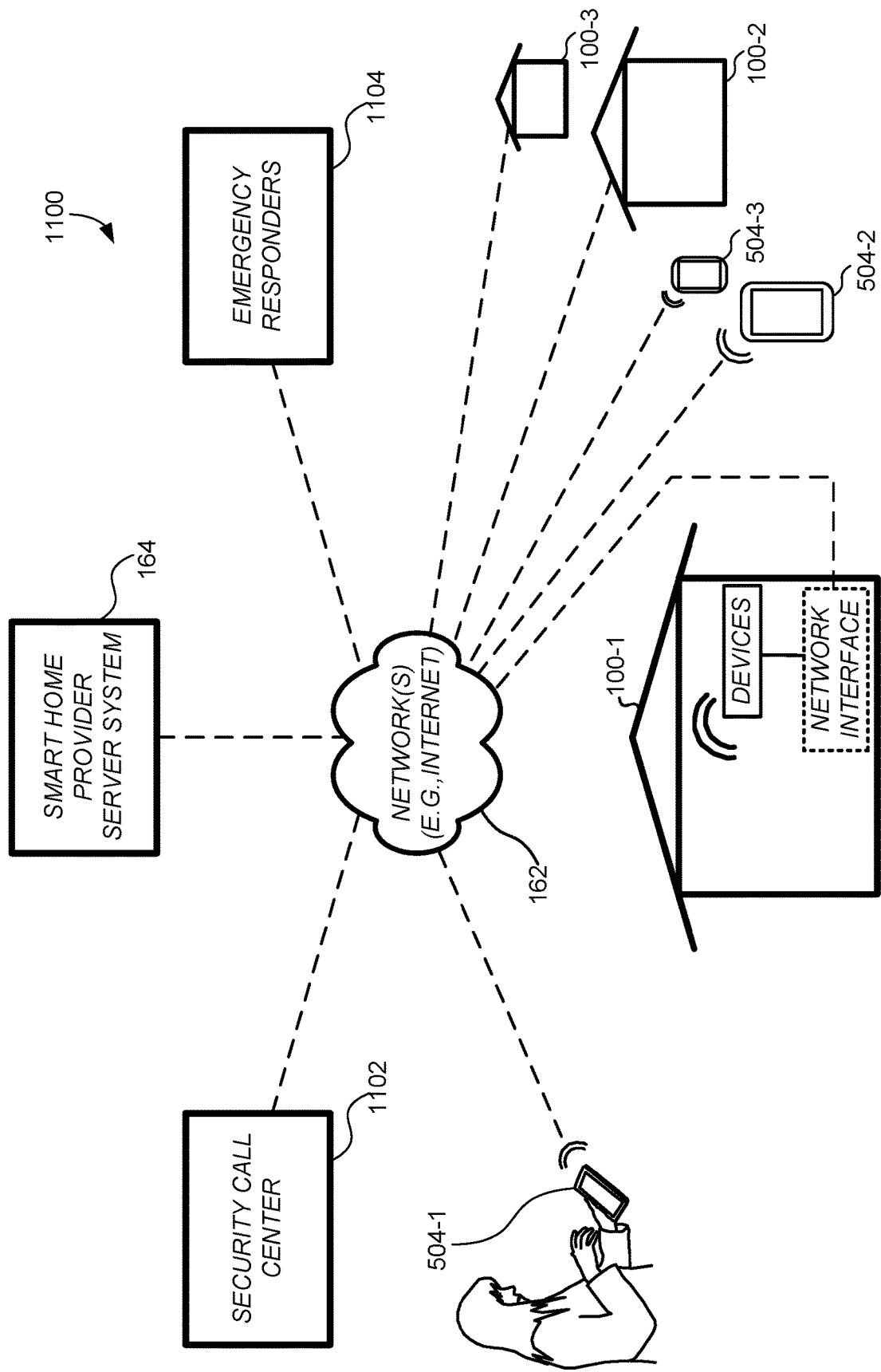
FIG. 11 is an example smart security network, in accordance with some implementations.

FIG. 11 is an example smart security network 1100, in accordance with some implementations. A smart security network 1100 may include a network 162 (e.g., Internet) through which multiple entities and devices communicate and operate. Such entities and devices may include smart home environments 100 (e.g., FIGS. 1 and 12) with multiple devices (e.g., smart devices of FIGS. 1 and 2), a security call center 1102, a smart home provider server system 164, emergency responders 1104, and client devices 504 (e.g., client device 504, FIG. 8).

By establishing interconnectivity and cross-communications between entities and devices within a smart security network 1100, users associated with a smart home environment 100 may be promptly notified and alerted as to any suspicious events concerning their property, such as the presence of potential intruders on the premises. In particular, the smart security network 1100 enables one or more devices of the smart home environments 100 (e.g., smart devices of FIGS. 1 and 2) to act as a network of diverse and robust sensors that sense various characteristics of their surrounding environment, which collectively provides users with a comprehensive understanding of a potentially suspicious activity. Given the comprehensive awareness provided by the devices of a smart home environments 100, users who may not be present at the premises are given a more accurate understanding of whether the suspicious event in fact requires further notifying others of the smart security network 1100 (e.g., alerting emergency responders 1104 and/or a security call center 1102), or whether the event is a false alarm (e.g., a relative expectedly entering the house). Consequently, users are given granular control in responding to a detected event by executing predefined security protocols, which may involve controlling devices of the smart home environments 100 (e.g., presenting an authentication request to an unverified user), or notifying other entities (e.g., security call center 1102) to take action.

As described previously with respect to FIGS. 1-4, a smart home environment 100 may include multiple devices (e.g., smart devices, such as devices 102, 104, 106, 108, 110, 112, 114, 116, 118, 120, and/or 120 of FIG. 1, smart devices 204 of FIG. 2, and/or a hub device 180) and a network interface (e.g., network interface 160, such as a router) for communicating with other entities and devices within the smart security network 1100. In addition to providing users with a situational awareness of activities occurring on the premises, devices in the smart home environment 100 may coordinate with one another to execute predefined security protocols (as described in greater detail with respect to FIGS. 14A-14E). In some implementations, devices in one smart home environment 100 may also communicate with devices in a different smart home environment 100 (e.g., devices of a first smart home environment 100 send notifications to devices of neighboring smart home environments 100, notifying neighbors that an intruder has been detected).

Devices of a smart home environment 100 may be controlled by and may send notifications to client devices 504 associated with authorized users of the smart home environment 100 (e.g., client device 504-1 receives a notification 1300, and user provides a user input indicating selection of the UI element 1316 corresponding to instructions sound alarm, FIG. 13A). Furthermore, in some implementations, client devices 504 may be used to alert and send notifications to other entities of a smart security network 1100 (e.g., security call center 1102, emergency responders 1104), or to communicate with other client devices 504 of the smart security network (e.g., neighbors, other members of the household).

The smart home provider server system 164 (as described previously) may be associated with a manufacturer, support entity, or service provider associated with the devices of a smart home environment 100. In the context of a smart security network 1100, the smart home provider server system 164 may coordinate one or more operations of smart devices in the smart home environment 100 (e.g., by sending/executing commands or instructions to one or more devices in accordance with a predefined security protocol). In some implementations, the smart home provider server system 164 also stores data received from the devices of a smart home environment 100, and may provide that data for use by other entities or devices within the smart security network 1100 (e.g., the smart home provider server system 164 stores surveillance footage captured by a camera 118-2 of a smart home environment 100 in FIG. 12, and transmits the footage to client devices 504, other smart home environments 100 in the neighborhood, the security call center 1102, and emergency responders 1104).

A security call center 1102 provides security services for one or more smart home environments 100. The security call center 1102 may include personnel (e.g., service representatives) and devices (e.g., server systems, telephone hotlines) for communicating with other entities or devices within the smart security network 1100 (e.g., receiving notifications from and sending commands to devices of a smart home environment 100, communicating with emergency responders 1104).

Emergency responders 1104 include organizations and entities that provide security, medical, and hazard related services to a community. Examples include law enforcements agencies (e.g., local police), emergency medical service providers (e.g., hospitals), firefighters, and/or other government or third-party agencies.

Figure 12:
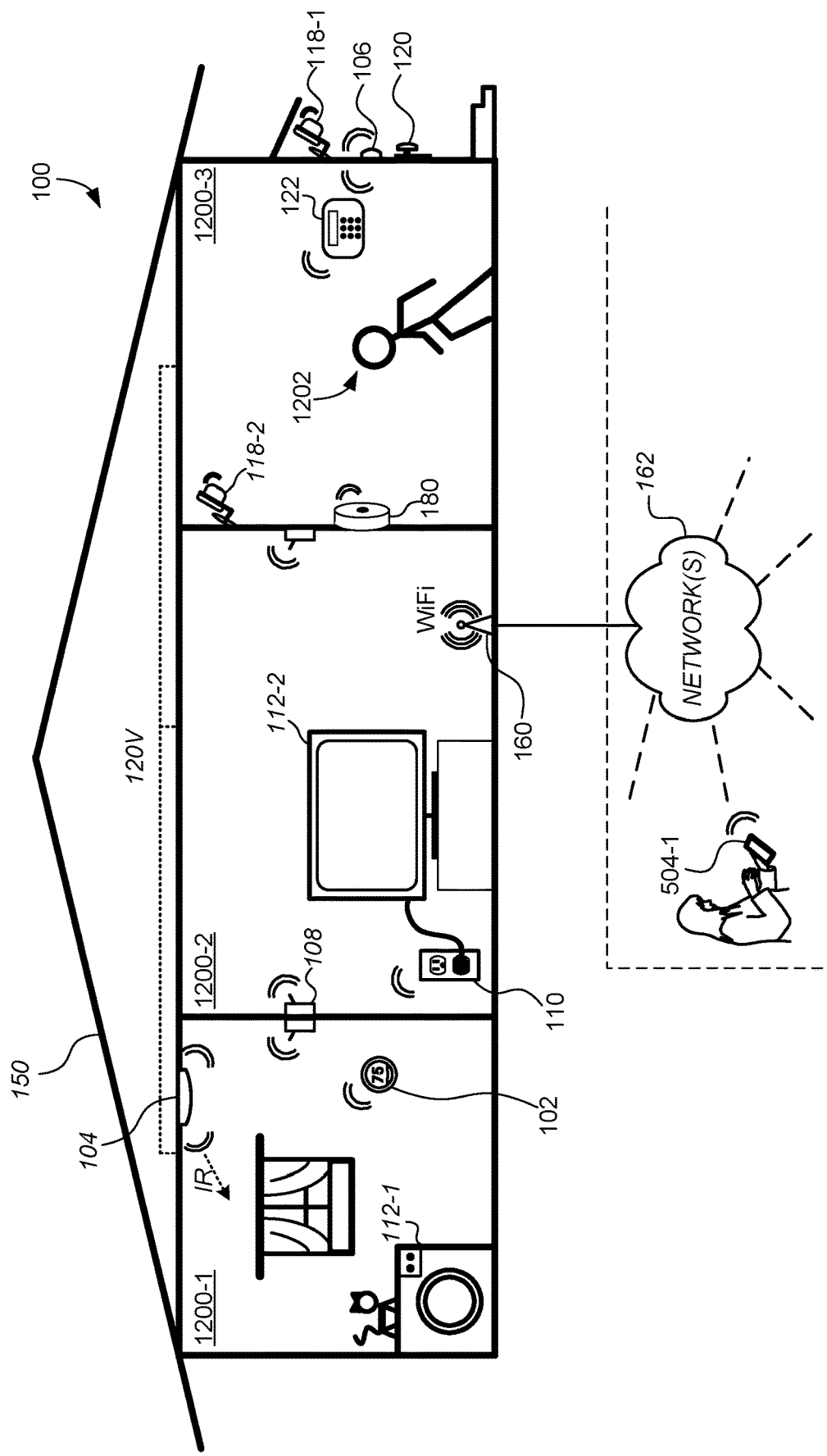
FIG. 12 is an example smart home environment in a smart security network, in accordance with some implementations.

As a non-limiting example for describing the interconnectivity of entities and devices within a smart security network 1100, referring to FIG. 11, an authorized user associated with the smart home environment 100-1 may receive a notification on the client device 504-1 regarding a potential intruder on the premises, detected by multiple devices (e.g., camera 118-2, hub device 180, FIG. 12). The notification may be in the form of a video captured by the camera 118-2, which is stored in, and transmitted to the user from, the smart home provider server system 164. In response, the authorized user may execute a security protocol, alerting the security call center 1102 who may then contact emergency responders 1104 (e.g., police) to investigate the premises. At the same time, executing the security protocol may also include sending instructions to devices of the smart home environment 100-1, such as commands to the smart alarm system 122 to sound an alarm on the premises, or commands to actuate a bolt of the smart doorlock 120 to temporarily lock-in the potential intruder. The security protocol may further include alerting neighbors of the user, for example by sending notifications to other smart home environments (e.g., 100-2 and 100-3) and client devices (e.g., 504-2 and 504-3).

FIG. 12 is an example smart home environment 100 in a smart security network 1100, in accordance with some implementations. In the example illustrated, the smart home environment 100 consists of a structure 150 with multiple rooms 1200, throughout which a variety of devices (e.g., smart devices) are positioned. Devices include a smart hazard detector 104, smart appliances 112 (e.g., washing machine, television), a smart thermostat 102, smart wall switches 108, a smart wall plug 110, a hub device 180, cameras 118, a smart doorbell 106, a smart doorlock 120, and a smart alarm system 122. The devices in the smart home environment 100 combine to create a mesh network through which data and instructions can be exchanged between devices, and communication with other entities, users, and devices of the smart security network 1100 is enabled (e.g., through a network interface 160). The smart home environment 100 (or any combination of devices within the smart home environment 100) is sometimes referred to as a "security system." Other implementations of the smart home environment 100 may include additional devices, systems, or entities not shown in FIG. 12 (e.g., security call center 1102, smart home provider server system 164, emergency responders 1104), which have merely been omitted for the sake of brevity and so as to not obscure the pertinent aspects of the implementation.

Smart home environments 100 and associated devices are described in greater detail with respect to FIG. 1. Thus, while some features of the smart home environment 100 in FIG. 12 are discussed, other features have not been so as not to obscure more pertinent aspects of the example implementation disclosed herein. Furthermore, while some example devices of the smart home environment 100 are illustrated, other implementations of the smart home environment 100 may include fewer or other additional devices.

FIG. 12 illustrates an example in which a trigger event is detected on the premises of the smart home environment 100. Trigger events are occurrences detected by one or more devices (e.g., devices in a smart home environment 100, FIGS. 1 and 12) that may or may not constitute a security breach. Premises upon which a trigger event may be detected include a perimeter established by the smart home environment 100 (e.g., in a room 1200, on the front yard outside of the structure 150, etc.), or by multiple smart home environments 100 (e.g., within a geo-fence perimeter established by multiple smart devices across multiple smart home environments 100 within a neighborhood). Trigger events may include detection of motion (e.g., a person walking through room 1200-3), openings of entryways (e.g., window, front door, garage), unexpected activation/deactivation of devices (e.g., unexpected powering on of the television 112-2), or detection of unusual activity patterns (e.g., unexpected detection of an individual in the smart home environment 100 on a particular day). In some implementations, trigger events are detected by one or more sensing capabilities of a device (or a group of devices) in the smart home environment 100 (e.g., occupancy data gathered by hub device 180 is considered together with surveillance footage captured by camera 118-2 to confirm presence of an intruder). Various trigger events are described in greater detail with respect to FIGS. 14A-14E.

In this example, an unverified user 1202 is detected in the room 1200-3 of the smart home environment 100 by the opening of the front door (e.g., detected by the smart doorbell 106 and/or the smart doorlock 120), and by the presence detection capabilities of the devices in the room (e.g., occupancy sensors of the camera 118-2, hub device 180, and/or the smart alarm system 122). Upon detecting the trigger event, one or more devices of the smart home environment 100 provide a notification to an authorized user who is not currently on the premises via a client device 504-1. As described in greater detail below, in response to the notification, the authorized user may determine that the unverified user is an intruder, and may then decide to execute a predefined security protocol (e.g., sounding an alarm, alerting the security call center 1102, etc.).

FIGS. 13A-13D illustrate examples of graphical user interfaces ("GUIs") for displaying notifications and executing operations responsive to notifications, in accordance with some implementations. The GUIs in these figures are used to illustrate interfaces related to the processes described below, including the method 1400 (FIGS. 14A-14E). While FIGS. 13A-13D illustrate examples of GUIs, in other implementations, one or more GUIs display user-interface elements in arrangements distinct from the implementations of FIGS. 13A-13D.

The GUIs shown in FIGS. 13A-13D may be displayed on any device of a smart security network 1100 having an output component (e.g., display, speaker, tactile feedback generator, etc.), such as mobile phones (e.g., client devices 504), smart devices (e.g., hub device 180, smart television 112-2, FIG. 1), or other electronic devices (e.g., personal computers, tablet computers, etc.). The GUIs may be provided by an application for managing devices of a smart home environment 100 (e.g., applications 824, FIG. 8), and/or a web browser application.

FIG. 13A illustrates a GUI for displaying a notification 1300 and selecting security protocols or operations to be executed. As shown, the notification 1300 indicates that a trigger event has been detected at a smart home environment 100 (e.g., associated with the authorized user of the client device 504). In this example, the notification 1300 indicates the particular room (e.g., room 1200-3) in which, and the time (e.g., 1:00 AM) at which the activity was detected.

The GUI of FIG. 13A also displays various user-interface ("UI") elements (e.g., 1310 to 1322) corresponding to security protocols and operations that an authorized user may choose to execute or decline to execute. Security protocols include one or a series of operations to be performed by one or more devices in a smart security network 1100. For example, executing a security protocol may include presenting a security question to the unverified user 1202 (e.g., by outputting audio through a built-in speaker in the hub device 180), monitoring for a response (e.g., using a built-in microphone of the camera 118-2), and sounding the alarm (e.g., in the smart alarm system 122) if the unverified user is determined to be an intruder.

In some implementations, in response to the notification 1300, a user input is detected (e.g., tap selection on a touch-sensitive display of the client device 504). Depending on the UI element selected, the user input corresponds to instructions to either execute or decline execution of a security protocol or operation. For example, in FIG. 13A, the authorized user may choose to: (1) view a live video feed (e.g., UI element 1310, causing surveillance footage captured by the camera 118-2 to be streamed to the client device 504-1, FIG. 12), (2) ignore the trigger event (e.g., UI element 1312, disarming smart alarm system 122 and declining to sound the alarm), (3) defer action (e.g., UI element 1314, sending the notification 1300 to a device of another household member to determine what action is to be taken), (4) sound the alarm (e.g., UI element 1316, causing the smart alarm system 122 to sound the alarm), (5) present a security question (e.g., UI element 1318, causing audio to be output through a built-in speaker of the camera 118-2), (6) alert a security call center (e.g., UI element 1320, causing a notification to be sent to the security call center 1102, FIG. 11), and/or (7) alert the police (e.g., UI element 1322, causing a notification to be sent to emergency responders 1104, FIG. 11). The GUI of FIG. 13A may also include an optional UI element which, when selected, executes a security protocol allowing the user to view a previously-recorded, rather than live video stream (e.g., UI element 1311, "View Clip/Photo"). This would be advantageous in situations in which a user or homeowner is slow to receive the notification 1300 and an unverified user has moved out of the video frame.

FIG. 13B illustrates a GUI displayed if the authorized user chooses to present a security question (e.g., UI element 1318, FIG. 13A). As shown, the authorized user may select from several questions (e.g., 1318-1 to 1318-4) to present to the unverified user. Alternatively, the authorized user may connect directly to a device within proximity to the unverified user (e.g., camera 118-2) and directly stream live audio via the client device 504 to be output through the nearby device.

In response to presenting the security question (e.g., selecting UI element 1318-1, "What is my dog's name?"), the GUI of FIG. 13C is displayed. Here, the unverified user has provided a response to the security question (e.g., by speaking into a microphone of the camera 118-2, generating an audio file which is then processed using speech recognition techniques), which is displayed in addition to a request for further instructions from the authorized user (e.g., user provides "Pepper" as an answer to the question, 1340). As shown, some options that were available when the authorized user received the initial notification (FIG. 13A) are also selectable in FIG. 13C. For example, after examining the unverified user's response, the authorized user may now choose to sound the alarm (e.g., UI element 1316) or alert the security call center 1102 (e.g., UI element 1320). In response to receiving the unverified user's response to the security question, the authorized user may additionally choose to listen to the recorded audio of the unverified user (e.g., UI element 1350) to eliminate the risk of a potential intruder knowing the correct answer, for example. The authorized user may also present another security question (e.g., UI element 1352) to further verify the identity of the unverified user.

Alternatively, if the authorized user chooses to defer action (e.g., UI element 1314, FIG. 13C), the GUI of FIG. 13D is displayed. Here, the authorized user may choose to defer action to one or more individuals (e.g., UI elements 1314-1 to 1314-3), such as the user's neighbor, brother, or wife. Consequently, the selected individual may receive (on an associated client device) the notification 1300 as shown in FIG. 13A, and may be given similar options with respect to responding to the notification.

FIGS. 13A-13D illustrate only examples of GUIs that may be displayed in performing the method 1400 described below (FIGS. 14A-14E). It is noted, however, that additional and/or alternative GUIs may be displayed, including UI elements corresponding to alternative and/or additional security protocols or operations that may be executed.

FIGS. 14A-14E are flow diagrams illustrating a method of detecting trigger events and executing security protocols, in accordance with some implementations. In some implementations, the method 1400 is performed by one or more electronic devices of one or more systems (e.g., devices of a smart home environment 100, FIGS. 1 and 12; devices 204 and/or hub device 180 of smart home network 202, FIG. 2), a server system (e.g., smart home provider server system 164 of FIGS. 1 and 2, hub server system 508 of FIG. 5), and/or one or more devices of a security provider (e.g., devices of security call center 102 in FIG. 11, not shown) and/or emergency response provider (e.g., devices of emergency responders 104 in FIG. 11, not shown). Thus, in some implementations, the operations of the method 1400 described herein are entirely interchangeable, and respective operations of the method 1400 are performed by any of the aforementioned devices, systems, or combination of devices and/or systems. For ease of reference, the methods herein will be described as being performed by a computer system (e.g., one or more smart devices 204 of a smart home environment 100, FIGS. 1, 2, and 9). FIGS. 14A-14E correspond to instructions stored in a computer memory or other computer-readable storage medium (e.g., respective memories 906 of one or more smart devices 204, FIG. 9).

The computer system detects (1402) a trigger event, including detecting an unverified user within the premises. In some implementations, detecting (1402) the trigger event includes detecting (1404) the opening of a door. In some implementations, detecting (1402) the trigger event includes receiving (1406) inputs from one or more distinct devices of the computer system (e.g., in FIG. 12, audio or video captured by a camera 118-2, motion data captured by a hub device 180, etc.). In some implementations, inputs may include unique digital fingerprints of a respective device of an unverified user (e.g., GSM Fingerprints). FIG. 12 illustrates an example in which multiple devices (e.g., hub device 180, camera 118-2, and/or smart alarm system 122) detect the presence of an unverified user 1202 in a room 1200-3 of the smart home environment 100.

In some implementations, detecting (1402) the trigger event includes obtaining (1408) an activity pattern of an authorized user, of one or more authorized users. Activity patterns indicate behavioral characteristics and patterns of users with respect to their actions at a premises over a period of time. For example, in some implementations, the activity pattern for the authorized user (1410) indicates, for a respective day of the week and/or a respective range of time: a time spent in an area (e.g., 5 hours spent in a particular room on Mondays) of the premises, and/or the number of instances in which the authorized user entered the area of the premises (e.g., user enters and leaves the room approximately 5 times in a given day). An activity pattern may also indicate a user's device usage patterns, including which devices are used most by a user, with what frequency/duration particular devices are used (e.g., television turned on 3 times a day, television turned on for 60 minutes total per day), and/or the settings with which particular devices are used (e.g., specific radio stations, channels, volume, etc.). Time measurements of an activity pattern spent may be an average or aggregate amount of time. Furthermore, time measurements may also be a particular hour, range of hours (e.g., between 3:00 PM to 5:00 PM), or general time of day (e.g., morning). In some implementations, the activity pattern is determined (1412) over a predefined period of time (e.g., over one month). In some implementations, the one or more authorized users are authorized occupants of the premises. Authorized occupants may include home owners, tenants, or any other type of individual expected to be present on or have access to the premises. In some implementations, machine learning techniques known to those skilled in the art are applied to generate and update user activity patterns.

In these implementations, detecting (1402) the trigger event further includes identifying (1414) an activity pattern of the unverified user, and determining (1416) that the activity pattern of the unverified user is at least partially distinct from the activity pattern of the authorized user. A trigger event is therefore detected by comparing and identifying differences between the recorded behavioral patterns of an authorized user and an unverified user. In some implementations, the activity patterns of the unverified user and the authorized user are distinct if the difference with respect to a particular measurement exceeds a threshold value (e.g., total time spent in an particular room deviates from a time spent by the authorized user, as indicated the activity pattern, by more than 1 hour). In some implementations, identifying the activity pattern of an unverified user begins immediately upon and continues while detecting the presence of the unverified user on the premises.

In some implementations, a current date and time is determined (1416), and determining (1418) that the activity pattern of the unverified user is at least partially distinct from the activity pattern of the authorized user is with respect to the current date and time (1420). In one example, the activity pattern for an authorized user may indicate that the authorized user only resides on the premises on Mondays between the hours of 9:00 AM and 3:00 PM. Therefore, if the activity pattern of an unverified user indicates the presence of the unverified user on the premises at 5:00 PM on Monday, a trigger event is detected.

In some implementations, the user may adjust the sensitivity with which the trigger event is detected. Adjusting the sensitivity of the trigger event may include excluding from trigger event detection particular regions of the premises (e.g., do not consider detected movements in the kitchen) and/or specific ranges/durations of time (e.g., do not consider detected activity between the times of 9:00 PM and 11:00 PM; do not consider movement in the kitchen for 5 hours).

Figure 14A:
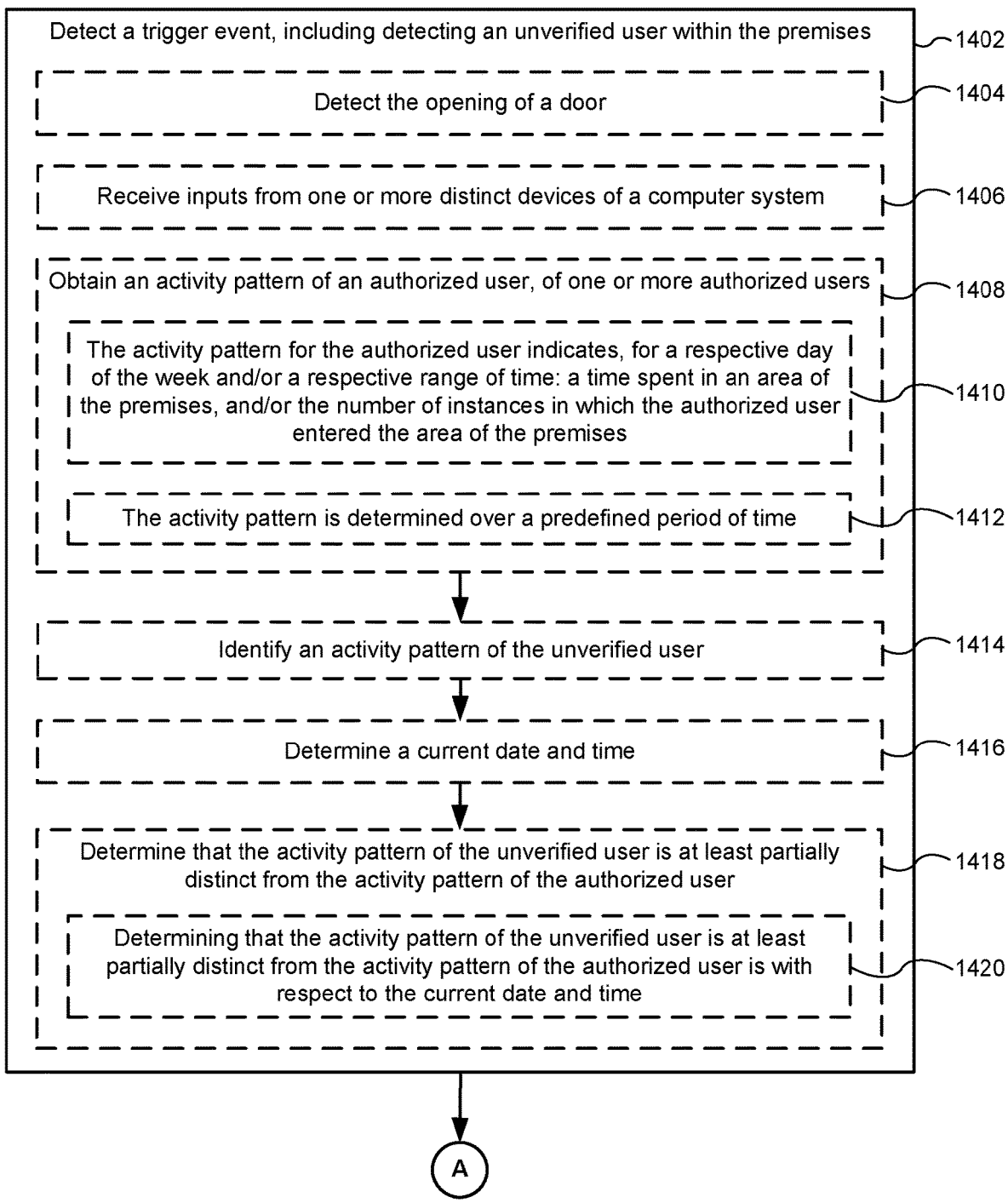
FIGS. 14A-14E are flow diagrams illustrating a method of detecting trigger events and executing security protocols, in accordance with some implementations.
Figure 14B:
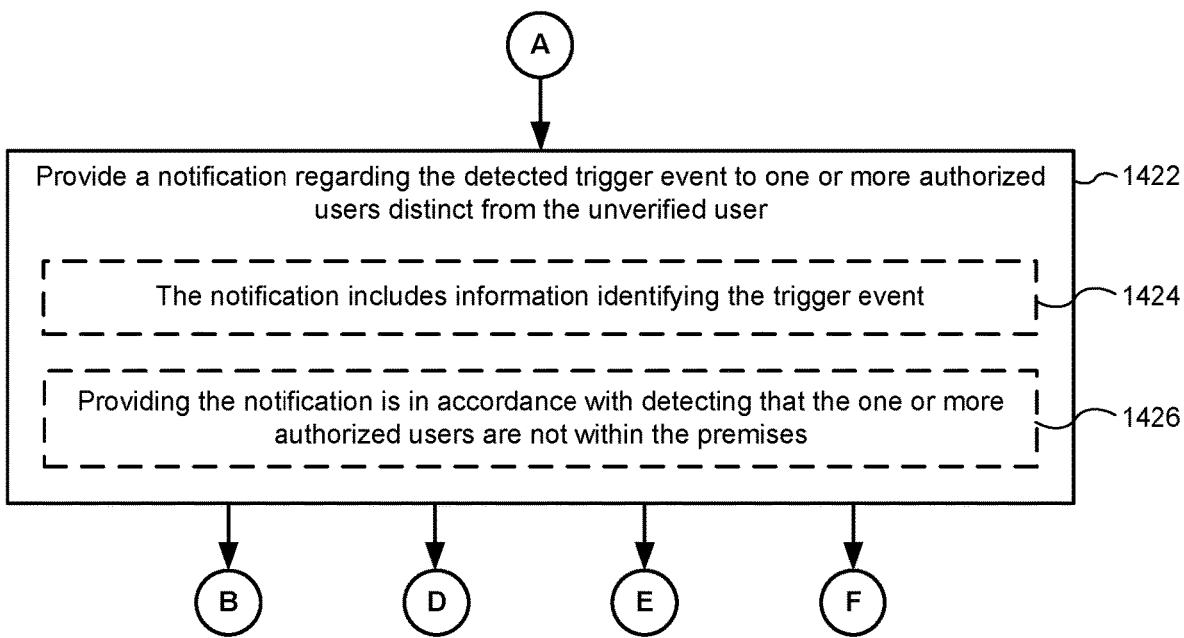

Referring now to FIG. 14B, after detecting (1402) the trigger event, a notification regarding the detected trigger event is provided (1422) to one or more authorized users distinct from the unverified user. For example, referring to FIG. 11, upon detecting a trigger event in a smart home environment 100-1, a notification may be provided to an authorized user of the smart home environment 100-1, in addition to users of smart home environments 100-2 and 100-3 who are neighbors of the authorized user. In some implementations, the notification includes (1424) information identifying the trigger event. FIG. 13A illustrates an example, where the notification 1300 states that activity has been detected in Room 1200-3 at 1:00 AM. In some implementations, providing (1422) the notification also includes streaming video content from a camera that has captured the trigger event (e.g., streaming video from the camera 118-2 to the client device 504-1, FIG. 12). In some implementations, providing (1422) the notification is in accordance with detecting (1426) that the one or more authorized users are not within the premises (e.g., users are outside a predefined perimeter of the premises or smart home environment). Additionally and/or alternatively, the notification is provided even if one or more authorized users are detected within the premises.

Responsive to the provided notification, user inputs are received which correspond to instructions to execute one or more security protocols and/or operations. Security protocols may be represented as selectable options on a GUI of a device, where the device is associated with an authorized user or smart home environment (e.g., UI elements 1310 to 1322 corresponding to various security protocols and operations are displayed on a client device 504, FIG. 13A). In some implementations, a user input may be a selection detected on a device associated with the authorized user or smart home environment (e.g., tap-selection and/or voice command received on a client device 504-1, FIG. 12). In some implementations, a respective security protocol is associated with a respective authorized user. For example, a security profile of a respective user may include a different set of security questions predefined by the respective user (e.g., security questions displayed in FIG. 13B correspond to the authorized user associated with the client device 504).

Figure 14C:
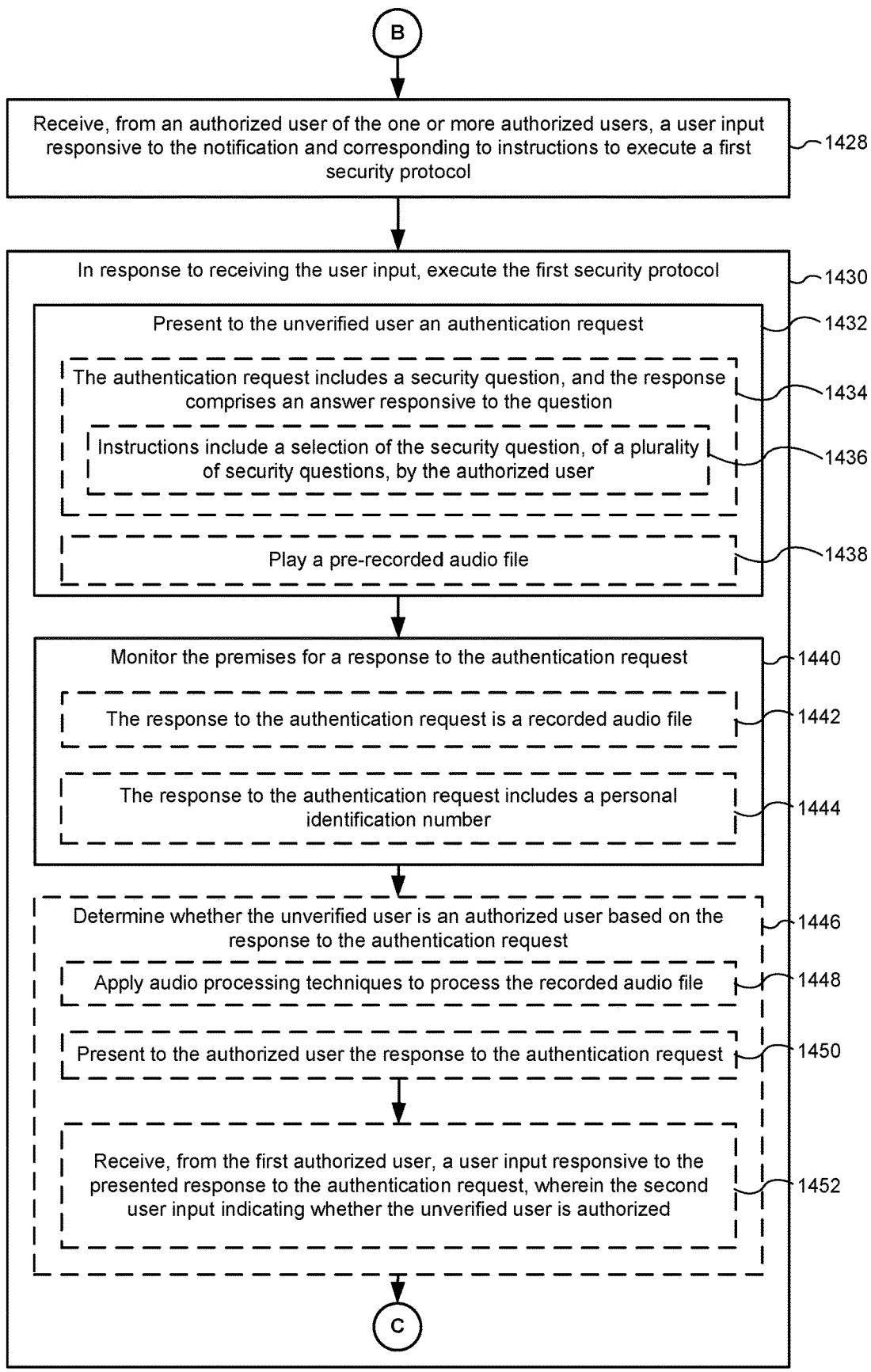

Referring to FIG. 14C, in some implementations, a user input responsive to the notification and corresponding to instructions to execute a first security protocol is received (1428) from an authorized user of the one or more authorized users. In response to receiving (1428) the user input, the first security protocol is executed (1430). The first security protocol (1430) includes presenting (1432) to the unverified user an authentication request. An authentication request may be a solicitation for a response from the unverified user to verify his or her identity. The authentication request may be presented through an output of a device (e.g., speaker and/or display of any devices in the smart home environment 100, FIG. 12).

In some implementations, the authentication request (1432) includes a security question (1434), and the response comprises an answer responsive to the question. FIGS. 13A and 13B illustrate an example in which an authorized user (associated with the client device 504) selects UI element 1318 ("Present Security Question") to execute a first security protocol to present a security question to the unverified user 1202 (FIG. 12). In some implementations, the instructions include a selection of the security question, of a plurality of security questions, by the authorized user (e.g., selecting one of the UI elements 1318-1 through 1318-4 corresponding to different security questions, FIG. 13B). In some implementations, presenting (1432) the authentication request includes playing (1438) a pre-recorded audio file (e.g., security question pre-recorded by an authorized user). In some implementations, presenting the authentication request includes receiving a live audio recording from the respective authorized user, and streaming the received audio to the unverified user (i.e., selecting UI element 1318-5 in FIG. 13B allows an authorized user to speak directly to the unverified user).

The premises are monitored (1440) for a response to the authentication request. A response to the authentication request may include an input provided to a device (e.g., using an input method of a device in close proximity to an unverified user, such as a microphone or touch-screen display). In some implementations, the response to the authentication request is a recorded audio file (1442). In some implementations, the response is a personal identification number (1444). Additionally and/or alternatively, responses to the authentication request may include a user input received on an interactive touch-screen device (e.g., selection of a response on the touch-screen of the hub device 180), a biometric sample (e.g., fingerprint, retinal scan), a username and password, detection of an authenticated RFID device (e.g., RFID tag), wireless pairing of an authenticated device (e.g., Wi-Fi, IR, Bluetooth), and/or any other personal identification means known to those skilled in the art. In some implementations, presenting the authentication request includes presenting multiple authentication requests (e.g., requiring both fingerprint and voice authentication samples).

Based on the response to the authentication request, the unverified user is then determined (1446) to be either an authorized user or unauthorized user. In some implementations, the unverified user is determined to be an unauthorized user (and a second security protocol may consequently be executed) if the response is an incorrect answer to a presented security question. In some implementations, audio processing techniques (e.g., voice recognition, speech-to-text) are applied (1448) to process the recorded audio file. The recorded audio file may therefore be automatically compared against voice samples of authorized users to determine whether the unverified user is an authorized user. Additionally and/or alternatively, the response to the authentication request is presented (1450) to the authorized user, and a user input responsive to the presented response is received (1452) from the first authorized user, the user input indicating whether the unverified user is authorized. For example, as shown in FIG. 13C, the user may listen to the recorded audio of an unverified user (e.g., by selecting UI element 1350) and may subsequently sound the alarm (e.g., by selecting UI element 1316) if he does not recognize the unverified user. By presenting the response, the authorized user is therefore better able to prevent unauthorized users who may happen to know a correct answer from bypassing the security protocol.

Figure 14D:
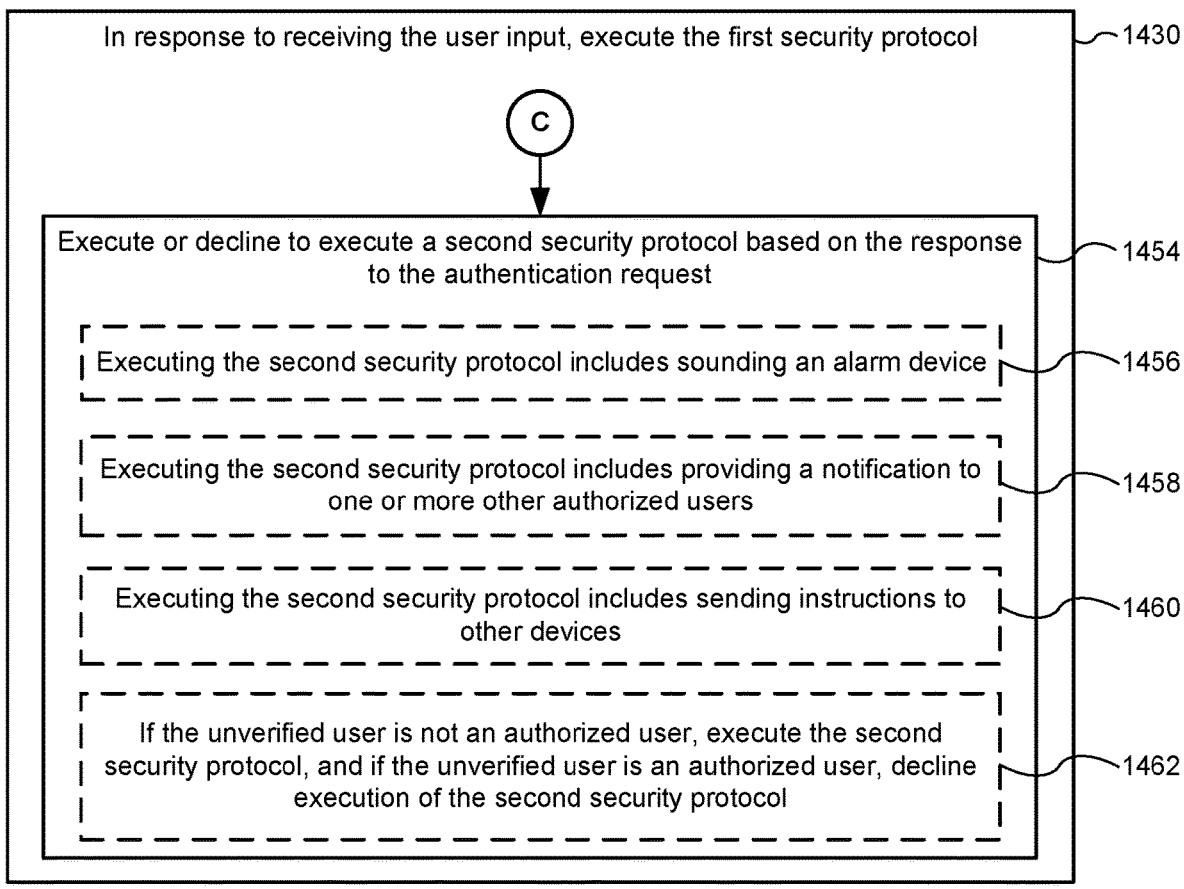

Referring now to FIG. 14D, based on the response to the authentication request, a second security protocol is executed or declined execution (1454). Compared to the first security protocol, the second security protocol may include escalated actions to be performed. Executing the second security protocol may, for example, include alerting providers of emergency response services (e.g., in FIG. 13C, selecting the UI element 1320 to alert a security call center 1102 or UI element 1322 to alert emergency responders 1104). In some implementations, executing the second security protocol includes sounding (1456) an alarm device (e.g., sounding smart alarm system 122, FIG. 12).

In some implementations, executing the second security protocol includes providing (1458) a notification to one or more other authorized users (e.g., sending the notification to other authorized member of the household associated with the smart home environment 100-1, in addition to users of smart home environments 100-2 and 100-3 who are neighbors of the authorized user, FIG. 11). In such implementations, the notification provided may be a notification of the trigger event, while in other implementations, the authorized users who receive the notification may also provide user inputs responsive to the notification and corresponding to instructions to execute a security protocol (e.g., presented with the GUI of FIG. 13A). Discretion in responding to the detected trigger event is therefore deferred to other authorized users who may be better positioned to determine whether the trigger event is a false alarm, or warrants an escalated action (e.g., a neighbor who has a view of the detected trigger event).

In some implementations, executing the second security protocol includes sending (1460) instructions to other devices (e.g., sending instructions to the smart doorlock 120 to lock an intruder in the house, FIG. 12).

In some implementations, if the unverified user is not an authorized user (determined automatically, or manually by an authorized user, step 1446 of FIG. 14C), the second security protocol is executed (1462), and if the unverified user is an authorized user, execution of the second security protocol is declined.

In some implementations, declining execution of the second security protocol includes foregoing any subsequent action (e.g., selecting the UI element 1312 to ignore the trigger event, FIG. 13C).

Figure 14E:
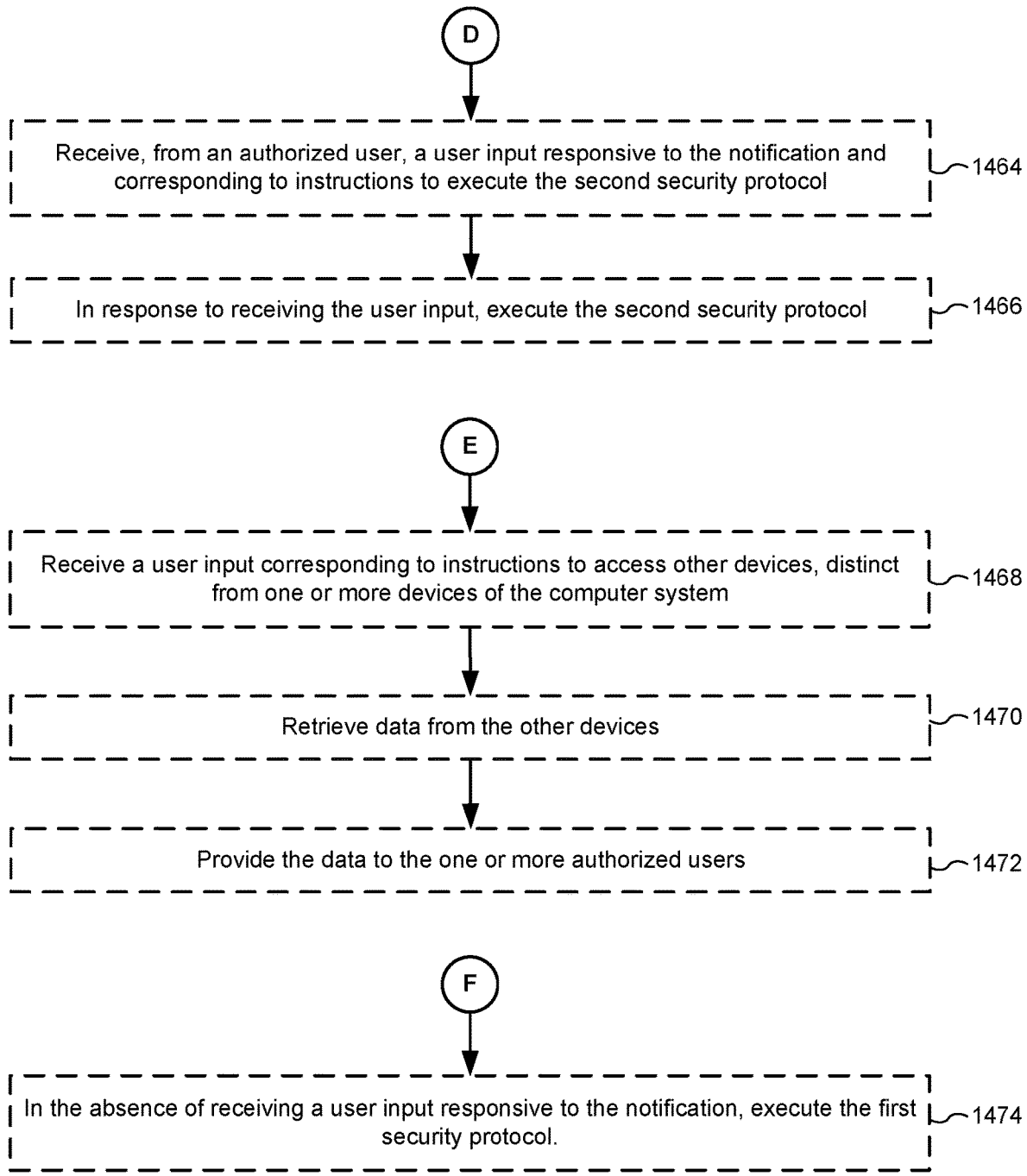

Alternatively, referring now to FIG. 14E, a user input responsive to the notification and corresponding to instructions to execute the second security protocol is received (1464) from an authorized user. In response to receiving the user input, the second security protocol is executed (1466). Escalated options that are selectable during execution of a first security protocol may therefore also be selectable as an alternative to the first security protocol. For example, referring to FIG. 13A-13C, the authorized user may alert the security call center either after viewing an unverified user's response to a presented security question (e.g., selecting UI element 1320, FIG. 13C), or alternatively may do so immediately in response to receiving the notification of the trigger event, without first presenting the security question (e.g., selecting UI element 1320, FIG. 13A).

In some implementations, a user input responsive to the notification and corresponding to instructions to execute a third security protocol is received from an authorized user. In response to receiving the user input, the third security protocol is executed, wherein the first security protocol, the second security protocol, and the third security protocol are distinct. Upon receiving the notification, the user may therefore choose a desired escalation path (e.g., first security protocol presents a security question, second security protocol includes alerting a call center, and third security protocol defers action to a neighbor).

In some implementations, a user input corresponding to instructions to access other devices, distinct from one or more devices of the computer system, is received (1468). Data is retrieved (1470) from the other devices, and the data is provided (1472) to the one or more authorized users. For example, once the authorized user is notified of the trigger event (e.g., detected by smart alarm system 122, FIG. 12), the user may access additional devices to determine whether the unverified user is an authorized user (e.g., accessing surveillance footage captured by a camera 118-2, FIG. 12).

In some implementations, in the absence of receiving a user input responsive to the notification, the first security protocol is executed (1474). For example, a user input may not be received if the authorized user lacks network connectivity (e.g., no cellular or Internet connection to the network 162, FIG. 12), or if the electronic device providing the notification of the trigger event or receiving the user input does not have network connectivity (e.g., due to power outage, device malfunction, etc.). Alternatively, in the absence of receiving a user input responsive to the notification, the second security protocol is executed (e.g., immediate escalation).

In some implementations, in the absence of receiving from the unverified user the response to the authentication request, the second security protocol is executed. In some implementations, the second security protocol is executed if the response is not received by a predefined time limit (e.g., within 30 seconds).

In some implementations, in response to detecting the trigger event (at 1402, FIG. 14A), the first security protocol is automatically (i.e., without a user input) executed. For example, in response to detecting the presence of an unverified user, a security question will automatically be presented, and a subsequent operation will be executed based on the unverified user's response.

In some implementations, prior to detecting a trigger event, a user input is received from an authorized user who is not within the premises, the user input corresponding to instructions to execute a security protocol. When executed, the security protocol includes presenting an authentication request and monitoring the premises for a response to the authentication request. If no response to the authentication request is detected, an arming protocol is executed (e.g., arming the smart alarm system 122, FIG. 12). Alternatively, if a response to the authentication request is detected, no action is performed. In some implementations, no action is performed if the authentication request is a security question, and the response to the authentication request is a correct answer to the security question. In some implementations, subsequent to executing the arming protocol, the trigger event is detected, where a security protocol (distinct from the security protocol for presenting the authentication request) is executed in response to detecting the trigger event (e.g., sounding an alarm, contacting security call center, etc.). Consequently, an authorized user who has left the premises unarmed can preemptively utilize an authentication request to determine whether other authorized occupants of the premises are present. If so, based on responses received to the authentication request, the premises will remain unarmed. However, if no responses are received, the premises will be armed, and any subsequently detected trigger events will automatically execute a predefined security protocol (e.g., sounding an alarm).

In some implementations, detecting the trigger event based on an activity pattern of the unverified user (1408) is further based on received user inputs for executing or declining to execute a security protocol (e.g., step 1454, 1466, etc.). As an example, detecting a trigger event may include detecting that a housekeeper who does not have an authorized client device has entered the premises through a side door of the premises every Monday at 9:00 AM. An authorized user, upon receiving a notification, may provide a user input for declining to execute a security protocol (e.g., declining to sound the alarm). Consequently, the activity pattern of the unverified user is modified such that similar activities detected in the future (e.g., side door entry every Monday at 9:00 AM) will not constitute the detection of a trigger event. In some implementations, modifying the activity pattern of the unverified user based on received user inputs is in accordance with the number of received user inputs in response to the detected activity pattern of the unverified user satisfying a threshold (e.g., declining to execute security protocol more than 5 times). User inputs therefore provide a feedback mechanism by which the computer system "learns" and better determines whether potentially suspicious activity is actually a trigger event that warrants further action. In some implementations, machine learning techniques are utilized to train the activity pattern of unverified users.

In some implementations, security protocols may combine any of the operations or features of the security protocols discussed herein (e.g., executing a predefined security protocol sounds an alarm and also notifies security call center). These security protocols may include performing one or more operations in a predefined sequence or order (e.g., notifying neighbors first before sounding the alarm). As indicated previously, the terms first, second, etc. used herein to describe various elements that are not to be limited by these terms, and are only used to distinguish one element from another. Thus, steps of the method 1400 (FIGS. 14A-14E) are not limited by the respective security protocols and/or user inputs with respect to which they are described (e.g., in step 1474 of FIG. 14E, in the absence of receiving a user input responsive to the notification, any security protocol (first, second, third, etc.) described herein may be executed).

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
   at a server system having one or more processors and memory storing instructions for execution by the one or more processors:
   in response to detection of a trigger event associated with a security device system located at a premises, providing a notification regarding the trigger event associated with the security device system to one or more authorized users and for display on a user interface of an application executed on a client device, wherein the server system is communicatively coupled to the security device system and the client device;
   receiving, from a first authorized user of the one or more authorized users, a first user input in response to the notification, the first input requesting a security message to be presented via the security device system;
   in response to receiving the first user input, causing the application to present on the user interface a plurality of security messages corresponding to a plurality of predefined system-generated audible security messages; and
   receiving from the first authorized user a second user input selecting one of the plurality of security messages for presenting a corresponding predefined system-generated audible security message via the security device system.

2. The method of claim 1, comprising:
   causing the application to present on the user interface a plurality of security responses that are selectable by the first authorized user for execution by the security device system, the first user input selecting a first security response of requesting a security message to be presented via the security device system from the plurality of security responses.

3. The method of claim 2, wherein the plurality of security responses further comprises alerting the police.

4. The method of claim 2, wherein the plurality of security responses further comprises communicating with one or more other client devices.

5. The method of claim 1, wherein the security device system further comprises one or more of:
   a surveillance device configured to collect data used for detecting the trigger event associated with the security device system within the premises;
   a speaker configured to present to a person the predefined system-generated audible security message corresponding to the selected one of the plurality of security messages; and
   a microphone configured to collect a response to the predefined system-generated audible security message corresponding to the selected one of the plurality of security messages at the premises.

6. The method of claim 1, wherein the trigger event associated with the security device system includes detection of a person, and providing the notification regarding the trigger event further includes providing a time of detection of the person and a corresponding location of the detected person, the corresponding location being within the premises.

7. The method of claim 6, wherein the person is detected according to a predetermined sensitivity that excludes a region of the premises from detection or specifies a range of time for detection.

8. The method of claim 1, wherein the trigger event associated with the security device system includes an activation of the security device system.

9. The method of claim 1, wherein the security device system includes a network-connected doorbell device.

10. A non-transitory computer readable storage medium, storing one or more programs for execution by one or more processors of a server system, the one or more programs comprising instructions for:

in response to detection of a trigger event associated with a security device system located at a premises, providing a notification regarding the trigger event associated with the security device system to one or more authorized users and for display on a user interface of an application executed on a client device, wherein the server system is communicatively coupled to the security device system and the client device;

receiving, from a first authorized user of the one or more authorized users, a first user input in response to the notification, the first input requesting a security message to be presented via the security device system;

in response to receiving the first user input, causing the application to present on the user interface a plurality of security messages corresponding to a plurality of predefined system-generated audible security messages; and receiving from the first authorized user a second user input selecting one of the plurality of security messages for presenting a corresponding predefined system-generated audible security message via the security device system.

11. The non-transitory computer readable storage medium of claim 10, wherein the selected one of the plurality of security messages includes a security question corresponding to the predefined system-generated audible security message, the one or more programs further comprising instructions for:

receiving a response to the security question, the response being collected by the security device system in the premises.

12. The non-transitory computer readable storage medium of claim 11, the one or more programs further comprising instructions for, after receiving the response to the security question:

receiving, by the server system, a third user input that selects a first security protocol from a plurality of security protocols; and in accordance with the selected first security protocol, sounding an alarm device.

13. The non-transitory computer readable storage medium of claim 11, the one or more programs further comprising instructions for, after receiving the response to the security question:

receiving, by the server system, a third user input that selects a first security protocol from a plurality of security protocols; and in accordance with the selected first security protocol, providing a notification to the police or one or more other authorized users associated with client devices that are distinct from the security device system.

14. A method, comprising:

at a client device having one or more processors and memory storing instructions for execution by the one or more processors:

in response to detection of a trigger event associated with a security device system located at a premises, providing a notification regarding the trigger event associated with the security device system to one or more authorized users and for display on a user interface of an application executed on the client device, wherein the client device is communicatively coupled to the security device system and a server system;

receiving, from a first authorized user of the one or more authorized users, a first user input in response to the notification, the first input requesting a security message to be presented via the security device system;

in response to receiving the first user input, causing the application to present on the user interface a plurality of security messages corresponding to a plurality of predefined system-generated audible security messages; and receiving from the first authorized user a second user input selecting one of the plurality of security messages for presenting a corresponding predefined system-generated audible security message via the security device system.

15. The method of claim 14, further comprising:

presenting on the user interface of the application a plurality of security responses that are selectable by the first authorized user for execution by the security device system, the first user input selecting a first security response of requesting a security message to be presented via the security device system from the plurality of security responses.

16. The method of claim 15, wherein providing the notification further comprises configuring the notification for display on the user interface of the application executed on the client device, and the first user input is entered on the user interface of the application executed on the client device and corresponds to instructions to execute the first security response.

17. The method of claim 15, wherein the plurality of security responses further comprises one or both of: alerting the police and communicating with one or more other client devices.

18. The method of claim 14, wherein the selected one of the plurality of security messages includes a security question corresponding to the predefined system-generated audible security message, the method further comprising receiving a response to the security question, the response being collected by the security device system in the premises.

19. The method of claim 14, wherein the trigger event associated with the security device system includes detection of a person, and providing the notification regarding the trigger event further includes providing a time of detection of the person and a corresponding location of the detected person, the corresponding location being within the premises.

20. The method of claim 14, wherein the security device system further comprises one or more of:

a surveillance device configured to collect data used for detecting the trigger event associated with the security device system within the premises;

a speaker configured to present to a person the predefined system-generated audible security message corresponding to the selected one of the plurality of security messages; and a microphone configured to collect a response to the predefined system-generated audible security message corresponding to the selected one of the plurality of security messages at the premises.

* * * * *